United States Patent
Patel et al.

(10) Patent No.: US 10,230,777 B2
(45) Date of Patent: Mar. 12, 2019

(54) SYSTEM AND METHOD FOR MEDIA ENCODING SCHEME (MES) SELECTION

(71) Applicant: Kodiak Networks Inc., Plano, TX (US)

(72) Inventors: Krishnakant M. Patel, Richardson, TX (US); Brahmananda R. Vempati, Dallas, TX (US); Harisha M. Negalaguli, Richardson, TX (US)

(73) Assignee: KODIAK NETWORKS INC., Plano, TX (US)

( * ) Notice: Subject to any disclaimer, the term of this patent is extended or adjusted under 35 U.S.C. 154(b) by 72 days.

(21) Appl. No.: 15/287,512

(22) Filed: Oct. 6, 2016

(65) Prior Publication Data

US 2017/0099328 A1 Apr. 6, 2017

Related U.S. Application Data

(60) Provisional application No. 62/237,965, filed on Oct. 6, 2015, provisional application No. 62/272,867, filed on Dec. 30, 2015.

(51) Int. Cl.
*H04L 29/06* (2006.01)
*H04B 7/06* (2006.01)
(Continued)

(52) U.S. Cl.
CPC ....... *H04L 65/4061* (2013.01); *H04B 7/0632* (2013.01); *H04L 1/00* (2013.01);
(Continued)

(58) Field of Classification Search
CPC ....... H04B 7/0632; H04L 1/00; H04L 49/355; H04L 5/0048; H04L 65/4061;
(Continued)

(56) References Cited

U.S. PATENT DOCUMENTS

| 3,912,874 A | 10/1975 | Botterell et al. |
| 4,796,293 A | 1/1989 | Blinken et al. |

(Continued)

FOREIGN PATENT DOCUMENTS

| GB | 2338150 A | 3/1998 |
| JP | 200392776 A | 10/2004 |

(Continued)

OTHER PUBLICATIONS

ETSI: "ETSI TS 100 812-2 v2.3.1 Terrestrial Trunked Radio (TETRA) Subscriber Identity Module to Mobile Equipment (SIM-ME) interface; Part 2: Universal Integrated Circuit Card (UfCC) Characteristics of the TSIM application", ETSI Technical Specification, Oct. 2003, all pages.

(Continued)

*Primary Examiner* — Kan Yuen

(57) ABSTRACT

An embodiment method includes initiating, by one or more servers of a push-to-talk (PTT) platform, a PTT call session in response to a PTT call session initiation request from a first client device, receiving, by the one or more servers, a first estimated modulation and coding scheme (MCS) from the first client device, and receiving, by the one or more servers, a first transmission in accordance with an initial media encoding scheme (MES) from the first client device during an initial volley. The method further includes transmitting, by the one or more servers, instructions to the first client device to use a first MES different than the initial MES for a second transmission during a subsequent volley.

19 Claims, 10 Drawing Sheets

(51) Int. Cl.
*H04L 5/00* (2006.01)
*H04W 4/10* (2009.01)
*H04L 1/00* (2006.01)
*H04L 12/931* (2013.01)
*H04W 88/10* (2009.01)
*H04W 80/10* (2009.01)

(52) U.S. Cl.
CPC .......... *H04L 1/0015* (2013.01); *H04L 1/0025* (2013.01); *H04L 5/0048* (2013.01); *H04L 65/607* (2013.01); *H04L 67/42* (2013.01); *H04L 69/22* (2013.01); *H04W 4/10* (2013.01); *H04L 1/0003* (2013.01); *H04L 1/0009* (2013.01); *H04L 1/0014* (2013.01); *H04L 49/355* (2013.01); *H04L 2001/0093* (2013.01); *H04W 80/10* (2013.01); *H04W 88/10* (2013.01)

(58) Field of Classification Search
CPC ....... H04L 65/607; H04L 67/42; H04L 69/22; H04W 4/10; H04W 80/10; H04W 88/10
See application file for complete search history.

(56) References Cited

U.S. PATENT DOCUMENTS

| | | |
|---|---|---|
| 5,212,832 A | 5/1993 | Ness-Cohn |
| 5,293,449 A | 3/1994 | Tzeng |
| 5,353,328 A | 10/1994 | Jokimies |
| 5,442,809 A | 8/1995 | Diaz et al. |
| 5,546,449 A | 8/1996 | Hogan et al. |
| 5,711,011 A | 1/1998 | Urs et al. |
| 5,752,196 A | 5/1998 | Ahvenainen et al. |
| 5,987,318 A | 11/1999 | Alperovich et al. |
| 5,987,331 A | 11/1999 | Grube et al. |
| 6,011,976 A | 1/2000 | Michaels et al. |
| 6,021,326 A | 2/2000 | Nguyen |
| 6,138,011 A | 10/2000 | Sanders, III et al. |
| 6,141,556 A | 10/2000 | Dougherty et al. |
| 6,192,119 B1 | 2/2001 | Wilson |
| 6,304,558 B1 | 10/2001 | Mysore |
| 6,397,054 B1 | 5/2002 | Hoirup et al. |
| 6,405,030 B1 | 6/2002 | Suprunov |
| 6,411,815 B1 | 6/2002 | Balasuriya |
| 6,473,501 B1 | 10/2002 | Paulsrud |
| 6,477,366 B1 | 11/2002 | Valentine et al. |
| 6,477,387 B1 | 11/2002 | Jackson et al. |
| 6,549,773 B1 | 4/2003 | Linden et al. |
| 6,577,874 B1 | 6/2003 | Dailey |
| 6,606,305 B1 | 8/2003 | Boyle et al. |
| 6,628,937 B1 | 9/2003 | Salin |
| 6,661,878 B1 | 12/2003 | Mirashrafi et al. |
| 6,725,053 B2 | 4/2004 | Rosen et al. |
| 6,751,468 B1 | 6/2004 | Heubel et al. |
| 6,801,762 B1 | 10/2004 | Huilgol |
| 6,856,676 B1 | 2/2005 | Pirot et al. |
| 6,865,398 B2 | 3/2005 | Mangal et al. |
| 6,892,074 B2 | 5/2005 | Tarkiainen et al. |
| 6,895,254 B2 | 5/2005 | Dorenbosch |
| 6,898,436 B2 | 5/2005 | Crockett et al. |
| 6,993,355 B1 | 1/2006 | Pershan |
| 6,996,414 B2 | 2/2006 | Vishwanathan et al. |
| 7,026,926 B1 | 4/2006 | Walker, III |
| 7,043,266 B2 | 6/2006 | Chaturvedi et al. |
| 7,082,316 B2 | 7/2006 | Elden et al. |
| 7,085,364 B1 | 8/2006 | Ahmed et al. |
| 7,099,291 B2 | 8/2006 | Harris et al. |
| 7,123,905 B1 | 10/2006 | Allaway et al. |
| 7,170,863 B1 | 1/2007 | Denman et al. |
| 7,231,225 B2 | 6/2007 | Rao et al. |
| 7,236,580 B1 | 6/2007 | Sarkar et al. |
| 7,330,540 B2 | 2/2008 | Darby et al. |
| 7,366,535 B2 | 4/2008 | Glass et al. |
| 7,403,775 B2 | 7/2008 | Patel et al. |
| 7,460,861 B2 | 12/2008 | Zabawskj |
| 7,529,557 B2 | 5/2009 | Farrill |
| 7,689,238 B2 | 3/2010 | Biswas et al. |
| 7,738,861 B2 | 6/2010 | Fournier |
| 7,738,892 B2 | 6/2010 | Ayyasamy et al. |
| 7,738,896 B2 | 6/2010 | Patel et al. |
| 7,751,348 B2 | 7/2010 | Shaffer et al. |
| 7,764,950 B2 | 7/2010 | Patel et al. |
| 7,787,896 B2 | 8/2010 | Kundu et al. |
| 7,797,010 B1 | 9/2010 | Manroa et al. |
| 7,813,722 B2 | 10/2010 | Patel et al. |
| 7,853,279 B2 | 12/2010 | Patel et al. |
| 8,036,692 B2 | 10/2011 | Ayyasamy et al. |
| 8,244,252 B2 | 8/2012 | Descombes |
| 8,369,829 B2 | 2/2013 | Nagubhai et al. |
| 8,478,261 B2 | 7/2013 | Vempati et al. |
| 8,498,660 B2 | 7/2013 | Lawler et al. |
| 8,670,760 B2 | 3/2014 | Lawler et al. |
| 8,676,189 B2 | 3/2014 | Lawler et al. |
| 8,913,494 B1 | 12/2014 | Marupaduga et al. |
| 9,282,130 B1 | 3/2016 | Goepp et al. |
| 2001/0005372 A1 | 6/2001 | Cave et al. |
| 2002/0009990 A1 | 1/2002 | Kleier et al. |
| 2002/0024943 A1 | 2/2002 | Karaul et al. |
| 2002/0077136 A1 | 6/2002 | Maggenti et al. |
| 2002/0086659 A1 | 7/2002 | Lauper |
| 2002/0086676 A1 | 7/2002 | Hendrey et al. |
| 2002/0102989 A1 | 8/2002 | Calvert et al. |
| 2002/0187750 A1 | 12/2002 | Majumdar |
| 2002/0196781 A1 | 12/2002 | Salovuori |
| 2003/0009463 A1 | 1/2003 | Gallant |
| 2003/0016632 A1 | 1/2003 | Refai et al. |
| 2003/0017836 A1 | 1/2003 | Vishwanathan et al. |
| 2003/0078064 A1 | 4/2003 | Chan |
| 2003/0119540 A1 | 6/2003 | Mathis |
| 2003/0148779 A1 | 8/2003 | Aravamudan et al. |
| 2003/0149774 A1 | 8/2003 | McConnell et al. |
| 2003/0153343 A1 | 8/2003 | Crockett et al. |
| 2003/0190888 A1 | 10/2003 | Mangal et al. |
| 2004/0032843 A1 | 2/2004 | Schaefer et al. |
| 2004/0057449 A1 | 3/2004 | Black |
| 2004/0067751 A1 | 4/2004 | Vandermeijden et al. |
| 2004/0095954 A1 | 5/2004 | Varney et al. |
| 2004/0121760 A1 | 6/2004 | Wetman et al. |
| 2004/0127233 A1 | 7/2004 | Harris et al. |
| 2004/0152441 A1 | 8/2004 | Wong |
| 2004/0176100 A1 | 9/2004 | Florkey et al. |
| 2004/0179531 A1 | 9/2004 | Bi et al. |
| 2004/0196826 A1 | 10/2004 | Bao et al. |
| 2004/0203793 A1 | 10/2004 | Dorenbosch |
| 2004/0219941 A1 | 11/2004 | Haaramo et al. |
| 2004/0224710 A1 | 11/2004 | Koskelainen et al. |
| 2004/0228292 A1 | 11/2004 | Edwards |
| 2004/0259580 A1 | 12/2004 | Florkey et al. |
| 2005/0047362 A1 | 3/2005 | Harris et al. |
| 2005/0101308 A1 | 5/2005 | Lee |
| 2005/0111430 A1 | 5/2005 | Spear et al. |
| 2005/0119012 A1 | 6/2005 | Merheb et al. |
| 2005/0143135 A1 | 6/2005 | Brems et al. |
| 2005/0164737 A1 | 7/2005 | Brown |
| 2005/0189337 A1 | 9/2005 | Baune |
| 2005/0192041 A1 | 9/2005 | Oxley et al. |
| 2005/0202807 A1 | 9/2005 | Ayyasamy et al. |
| 2005/0221819 A1 | 10/2005 | Patel et al. |
| 2005/0232241 A1 | 10/2005 | Wu et al. |
| 2005/0239485 A1 | 10/2005 | Kundu et al. |
| 2005/0254464 A1 | 11/2005 | Patel et al. |
| 2005/0255811 A1 | 11/2005 | Allen et al. |
| 2005/0261016 A1 | 11/2005 | Patel et al. |
| 2006/0003740 A1 | 1/2006 | Munje |
| 2006/0003751 A1 | 1/2006 | Vo |
| 2006/0019654 A1 | 1/2006 | Farrill |
| 2006/0029189 A1 | 2/2006 | Patel et al. |
| 2006/0030347 A1 | 2/2006 | Biswas |
| 2006/0056361 A1 | 3/2006 | Jiang et al. |
| 2006/0067499 A1 | 3/2006 | Oliveira et al. |
| 2006/0078064 A1 | 4/2006 | Schmidt et al. |
| 2006/0094455 A1 | 5/2006 | Hannu et al. |
| 2006/0116150 A1 | 6/2006 | Bhutiani |

(56) References Cited

U.S. PATENT DOCUMENTS

| | | |
|---|---|---|
| 2006/0128411 A1 | 6/2006 | Turcanu |
| 2006/0178138 A1 | 8/2006 | Ostroff et al. |
| 2006/0189337 A1 | 8/2006 | Farrill et al. |
| 2006/0198334 A1 | 9/2006 | Civanlar et al. |
| 2006/0229090 A1 | 10/2006 | Ladue |
| 2006/0234687 A1 | 10/2006 | Patel et al. |
| 2007/0037562 A1 | 2/2007 | Smith-Kerker et al. |
| 2007/0037597 A1 | 2/2007 | Biswas et al. |
| 2007/0037598 A1 | 2/2007 | Ayyasamy et al. |
| 2007/0049314 A1 | 3/2007 | Balachandran et al. |
| 2007/0070976 A1 | 3/2007 | Mussman et al. |
| 2007/0094409 A1 | 4/2007 | Crockett et al. |
| 2007/0099609 A1 | 5/2007 | Cai |
| 2007/0133478 A1 | 6/2007 | Armbruster et al. |
| 2007/0133757 A1 | 6/2007 | Girouard et al. |
| 2007/0154005 A1 | 7/2007 | Daigle |
| 2007/0177602 A1* | 8/2007 | Pichelin ............ H04W 4/10 370/395.2 |
| 2007/0189487 A1 | 8/2007 | Sharland et al. |
| 2007/0190492 A1 | 8/2007 | Schmitt |
| 2007/0190984 A1 | 8/2007 | Ayyasamy et al. |
| 2007/0197234 A1 | 8/2007 | Gill et al. |
| 2007/0204039 A1 | 8/2007 | Inamdar |
| 2007/0217591 A1 | 9/2007 | Yasuma |
| 2007/0218885 A1 | 9/2007 | Pfleging et al. |
| 2007/0253347 A1 | 11/2007 | Patel et al. |
| 2008/0064364 A1 | 3/2008 | Patel et al. |
| 2008/0126230 A1 | 5/2008 | Bellora et al. |
| 2008/0147671 A1 | 6/2008 | Simon et al. |
| 2008/0159128 A1 | 7/2008 | Shaffer et al. |
| 2008/0299953 A1 | 12/2008 | Rao |
| 2009/0080356 A1 | 3/2009 | Song et al. |
| 2009/0092116 A1 | 4/2009 | Jiang et al. |
| 2009/0119678 A1 | 5/2009 | Shih et al. |
| 2009/0149167 A1 | 6/2009 | Patel et al. |
| 2009/0161590 A1 | 6/2009 | Lewis et al. |
| 2009/0209235 A1 | 8/2009 | Lawler et al. |
| 2009/0279512 A1 | 11/2009 | Fujishima |
| 2009/0325540 A1 | 12/2009 | Yach et al. |
| 2010/0035593 A1 | 2/2010 | Fanco et al. |
| 2010/0142414 A1 | 6/2010 | Patel et al. |
| 2010/0190492 A1 | 7/2010 | Jiang |
| 2010/0197335 A1 | 8/2010 | Jin et al. |
| 2010/0234018 A1 | 9/2010 | Lawler et al. |
| 2011/0151917 A1 | 6/2011 | Mao et al. |
| 2011/0183659 A1 | 7/2011 | Ayyasamy et al. |
| 2011/0250923 A1 | 10/2011 | Miller et al. |
| 2012/0026947 A1 | 2/2012 | Miller et al. |
| 2012/0278496 A1 | 11/2012 | Hsu |
| 2013/0021933 A1 | 1/2013 | Kovvali et al. |
| 2013/0021965 A1 | 1/2013 | Chu et al. |
| 2013/0084911 A1 | 4/2013 | Chang |
| 2013/0136025 A1 | 5/2013 | Li et al. |
| 2013/0155875 A1 | 6/2013 | Ayyasamy et al. |
| 2013/0196706 A1 | 8/2013 | Patel et al. |
| 2013/0272436 A1 | 10/2013 | Makhlouf et al. |
| 2013/0315164 A1 | 11/2013 | Arur et al. |
| 2013/0337859 A1 | 12/2013 | Patel et al. |
| 2014/0056220 A1 | 2/2014 | Poitau et al. |
| 2014/0078898 A1 | 3/2014 | Anchan et al. |
| 2014/0133443 A1 | 5/2014 | Malladi et al. |
| 2014/0148210 A1 | 5/2014 | Kundu et al. |
| 2014/0219083 A1 | 8/2014 | Mandyam et al. |
| 2014/0219255 A1 | 8/2014 | Eyuboglu et al. |
| 2014/0226746 A1 | 8/2014 | Ko et al. |
| 2014/0274080 A1 | 9/2014 | Gilbert et al. |
| 2015/0078295 A1 | 3/2015 | Mandyam et al. |
| 2015/0085797 A1 | 3/2015 | Ji et al. |
| 2015/0092704 A1 | 4/2015 | Chen |
| 2015/0117347 A1 | 4/2015 | Iwai |
| 2015/0163039 A1 | 6/2015 | Davydov et al. |
| 2015/0173107 A1 | 6/2015 | Newberg et al. |
| 2015/0245326 A1* | 8/2015 | Rune ............ H04L 1/0003 370/329 |
| 2015/0365961 A1 | 12/2015 | Strasman et al. |
| 2016/0269945 A1 | 9/2016 | Jang et al. |
| 2016/0277992 A1 | 9/2016 | Cao |

FOREIGN PATENT DOCUMENTS

| | | |
|---|---|---|
| WO | 00069189 | 11/2000 |
| WO | 0079825 A1 | 12/2000 |
| WO | 0167674 A2 | 9/2001 |
| WO | 02101981 A1 | 12/2002 |
| WO | 03101007 A1 | 12/2003 |
| WO | 2005009006 A2 | 1/2005 |
| WO | 2005112494 A1 | 11/2005 |
| WO | 2005115032 A1 | 12/2005 |
| WO | 2005117474 A1 | 12/2005 |
| WO | 2006105287 A2 | 10/2006 |
| WO | 2010048217 A1 | 4/2010 |
| WO | 2010117815 A1 | 10/2010 |
| WO | 2014169461 A1 | 10/2014 |
| WO | 2015105970 A1 | 7/2015 |

OTHER PUBLICATIONS

Nokia: "What is TETRA? Why Nokia TETRA?", The Nokia TETRA Primer, 2002, pp. 1-29.

Skype: "Skype", Web Archive—Skype, May 22, 2004, pp. 1-2, May 22, 2004, pp. 1-2.

Trachwell: "TrackWell Software and Tetra Iceland deliver value added services to Tetra users", trackwell.com, Oct. 2002, pp. 1-1.

* cited by examiner

SYSTEM AND METHOD FOR MEDIA ENCODING SCHEME (MES) SELECTION

CROSS-REFERENCE TO RELATED APPLICATIONS

This application claims the benefit of U.S. Provisional Application No. 62/237,965, filed on Oct. 6, 2015, and U.S. Provisional Application No. 62/272,867, filed on Dec. 30, 2015, which applications are hereby incorporated herein by reference.

TECHNICAL FIELD

The present invention relates generally to communications over a telecommunications network, and in particular embodiments, to techniques and mechanisms for media encoding scheme (MES) selection.

BACKGROUND

Push-to-Talk (PTT) platforms involve providing PTT functionality (e.g., call group management, call origination, call transmittal, talk-back call termination, floor management, filtering, etc.) through clients on client devices. The PTT functions may be performed by one or more servers, and communications between the client devices and the servers may be performed over a network.

SUMMARY

In accordance with an embodiment, a method includes initiating, by one or more servers of a push-to-talk (PTT) platform, a PTT call session in response to a PTT call session initiation request from a first client device, receiving, by the one or more servers, a first estimated modulation and coding scheme (MCS) from the first client device, and receiving, by the one or more servers, a first transmission in accordance with an initial media encoding scheme (MES) from the first client device during an initial volley. The method further includes transmitting, by the one or more servers, instructions to the first client device to use a first MES different than the initial MES for a second transmission during a subsequent volley. The subsequent volley is after the initial volley, and the first MES selected is in accordance with the first estimated MCS. Initiating the PTT call session may include initiating a one-on-one (1-1) call session between the first client device and a second client device, and the method may further include forwarding, by the one or more servers, the first transmission to second client device using the initial MES. Initiating the PTT call session may include initiating a group call session between the first client device and a plurality of second client devices, and the method may further include forwarding, by the one or more servers, the first transmission to a first subset of the plurality of second client devices using the initial MES and forwarding, by the one or more servers, the first transmission to a second subset of the plurality of second client devices using one or more second MES's. Each of the one or more second MES's is different than the initial MES. The one or more second MES's may be selected in accordance with an estimated MCS corresponding to one of the second subset of the plurality of second client devices, a historic channel quality index (CQI) value corresponding to the second subset of the plurality of second client devices, or a combination thereof. The method may further include receiving, by the one or more servers, a second estimated MCS from a second client device, the PTT call session being between the first client device and the second client device. The method may further include transmitting, by the one or more servers, instructions to the second client device to use a second MES different than the initial MES for third transmissions during the subsequent volley. The second MES is selected in accordance with the second estimated MCS. The initial MES may use a lower frame rate than a first MES corresponding to the first estimated MCS. Receiving the first transmission in accordance with the initial MES may include receiving the first transmission encoded using Advanced Multi-Band Excitation (AMBE) 2.6 kbps or Codec2. Receiving the first estimated MCS may include receiving the first estimated MES in a session initiation protocol (SIP) OPTIONS message with a media burst control protocol (MBCP) acknowledgement (ACK) message, a call session initiation request, a wake-up message, a predictive wakeup call setup message, a predictive wakeup ACK message, or a pre-call keep alive message. The first client device may be aware of the initial MES prior to initiating the PTT call session.

In accordance with an embodiment, a telecommunications services platform includes one or more processors and a non-transitory computer readable storage medium storing programming for execution by the one or more processors. The programming includes instructions to initiate a call session in response to a call session initiation request from a first client device, receive a first estimated modulation and coding scheme (MCS) from the first client device, receive a first transmission in accordance with an initial media encoding scheme (MES) from the first client device during an initial volley, and transmit instructions to the first client device use a first MES different than the initial MES for a second transmission during a subsequent volley. The subsequent volley is after the initial volley, and the first MES is selected in accordance with the first estimated MCS. The initial volley begins when the telecommunications services platform receives the call session initiation request, and the initial volley ends when the first client device releases floor control. The first client device communicates with the telecommunications services platform using a radio access network (RAN), and the first estimated MCS is in accordance with an estimated channel quality index (CQI) of a channel between the first client device and the RAN. The first MES is further selected in to accordance with overall PTT call density in a cell the first client device is located, a call session type of the call session, service quality constraints, or a combination thereof. The first transmission is encoded using Advanced Multi-Band Excitation (AMBE) 2.6 kbps or Codec2. The call session may be a one-on-one (1-1) push-to-talk (PTT) call session or a group PTT call session.

In accordance with an embodiment, a method includes initiating, by one or more servers of a push-to-talk (PTT) platform, a PTT broadcast call session in response to a PTT broadcast call session initiation request from a first client device, receiving, by the one or more servers, a first estimated modulation and coding scheme (MCS) from the first client device, and transmitting, by the one or more servers, instructions to the first client device use a first MES for a transmission during the PTT broadcast call session. The first MES is selected in accordance with the first estimated MCS. The method further includes receiving, by the one or more servers, a first transmission in accordance with the first MES from the first client device. The first client device communicates with the one or more servers using a radio access network (RAN), and the first estimated MCS is in accordance with an estimated channel quality index (CQI) of a channel between the first client device and the RAN. The method may further comprise forwarding, by the one or more servers, the first transmission to a plurality of second client devices using a second MES. The second MES defines a maximum frame rate supported by the one or more servers. The first MES defines a frame rate, codec, code rate, or a combination thereof to encode transmission between the first client device and the one or more servers.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions, and alterations can be made herein without departing from the spirit and scope of this disclosure as defined by the appended claims.

Although various embodiments are described in a particular context, e.g., a media encoding scheme (MES) selection mechanism within a Push-to-Talk (PTT) platform, various embodiments may also apply to other telecommunication services platforms where MES selection is desired.

A system and method for MES selection is provided in accordance with various embodiments. In particular, users of a telecommunications services platform (e.g., a PTT platform) may access the platform using a radio access network (RAN). The RAN may act as a communications medium between an application client on a client device and servers of the telecommunications services platform. The application client is configured to provide an estimated modulation and coding scheme (MCS) and/or suggested MES to the application server based on channel parameters of the RAN. The estimated MCS and/or suggested MES may or may not be used to select a MES for communications between the application client and the server depending on the type of communication. For example, in a PTT platform, the application server may use an initial MES (e.g., an MES that is predefined and independent from the estimated MCS) for user traffic during an initial volley of a one-on-one call session or a group call session. The initial MES may be selected in order to reduce call setup time. During subsequent volleys or during a broadcast call session, the application server may use a client-specific MES for user traffic, and the client-specific MES may be selected in accordance with the estimated MCS. Various advantages may be achieved, such as, improved RAN usage efficiency and reduced RAN congestion while maintaining relatively fast call setup times.

Figure 1:
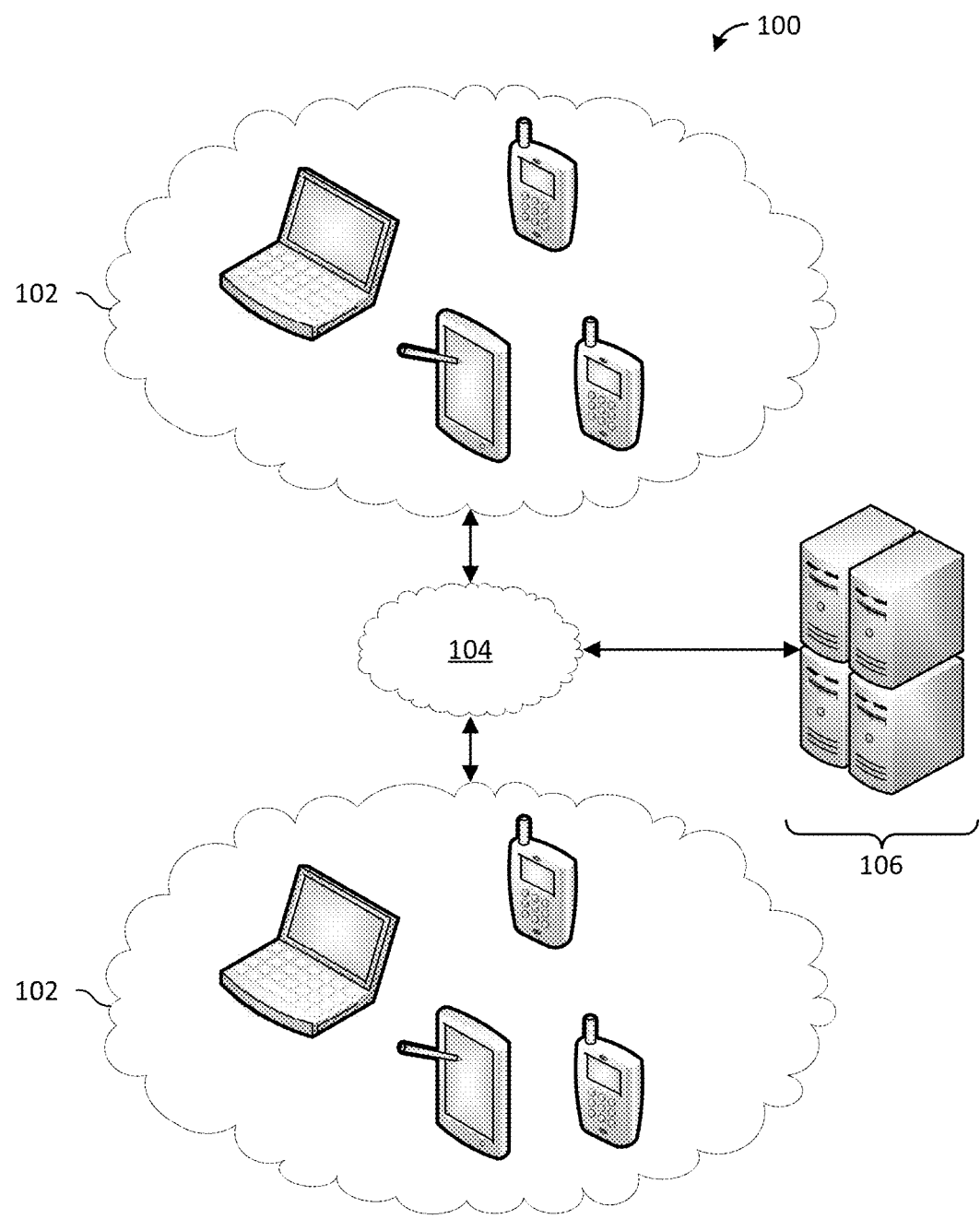
FIG. 1 is a diagram of a communications system according to various embodiments.

FIG. 1 is a diagram of a communications system 100, which provides an architecture for supporting a telecommunications solution (e.g., a push-to-talk (PTT) communications solution) in accordance with some embodiments. Communications system 100 includes client devices 102, a communications network 104, and a telecommunications services platform 106. As used herein, the term "client device" refers to any component (or collection of components) capable of establishing a connection with a communications network, such as a user equipment (UE), a mobile station (STA), a cellular phone, a tablet, a laptop, and other wired/wirelessly enabled devices. Applications (referred to hereinafter as "clients") reside on the client devices 102 for accessing various functions, such as PTT functions, provided by the telecommunications solution.

Client devices 102 may communicate with the telecommunications services platform 106 over the communications network 104, which may be accessed by the client devices 102 through a cellular network deployed by a carrier, a WiFi network, a RAN, other wireless networks, a wired internet protocol (IP) network, combinations thereof, or the like. Communications network 104 may include one or more components (e.g., base stations) configured to provide wireless or wired network access, such as an enhanced Node B (eNB), a macro-cell, a femtocell, a Wi-Fi access point (AP), combinations thereof, or the like. Furthermore, communications network 104 may operate in accordance with one or more wireless communication protocols, e.g., open mobile alliance (OMA), LTE, LTE advanced (LTE-A), High Speed Packet Access (HSPA), Wi-Fi 802.11a/b/g/n/ac, etc. In some embodiments, communications network 104 may comprise various other devices, such as relays, low power nodes, etc. Communications network 104 may further include backhaul network components, such as various gateways, routers, controllers, schedulers, and the like.

In an embodiment where telecommunications services platform 106 is a PoC platform, subscribers to a PTT solution (e.g., users operating the client devices 102) may be provisioned onto communications system 100 via interfaces to carriers (e.g., cellular carriers). PTT customers (e.g., enterprises) can administer these subscribers to form closed groups for PTT communications. The PTT solution may interface with the carrier, for example, by including connectivity to the carrier's core network, billing interfaces, provisioning interfaces, lawful intercept interfaces, customer care interfaces, and the like. The PTT platform may provide a plurality of PTT functions to the client devices 102 through the PTT clients on the client devices 102 as described in greater detail below.

In some embodiments, telecommunications services platform 106 uses container technology for virtualization of a telecommunications system architecture, such as, the virtualization of provided PTT services. Example container technologies may include Docker, Rocket, LXD, and the like although the architecture is not limited to a specific container technology. Virtualization using container technology may allow the telecommunications services platform 106 to adopt a micro-services model in which service clusters are considered the building blocks of the system architecture. For example, each function provided by the telecommunications services platform 106 may be virtualized in a unique service cluster, and each service cluster may perform a different function in the telecommunications services platform 106. Service clusters are hosted on virtual machines of an embodiment cloud network. An embodiment cloud network may include a plurality of geographically diverse deployment sites (e.g., data centers) where various virtual machines are physically deployed. Decomposition of the system into a set of services allows each service (e.g., each function provided by the telecommunications services platform) to be independently deployed and managed. Thus, system resilience may be improved as failures are localized to individual services. Furthermore, rapid and agile deployment of services may also be achieved.

In some embodiments, telecommunications services platform 106 incorporates distributed databases, clustering technologies, data analytics tools, and messaging middleware to provide a robust, scalable platform. Telecommunications services platform 106 may use fully virtualized components with a layered approach to service orchestration, which allows telecommunications services platform 106 to be integrated into various cloud environments, such as a carrier's private cloud infrastructure, a dedicated PTT cloud infrastructure, combinations thereof, and the like. A more detailed description of an embodiment telecommunications services platform may be found in commonly-assigned U.S. patent application Ser. No. 14/994,757 filed on Jan. 13, 2016, entitled "System and Method for Elastic Scaling using a Container-Based Platform," which is hereby incorporated by reference. Other telecommunication services platforms, including other PTT platforms, may be used in other embodiments.

The traffic patterns of PTT typically have several characteristics. Group calls are common, which may require a large number of radio resources to be simultaneously used and may require significant downlink traffic compared to uplink traffic. Traffic is typically one-way, e.g., a particular speech direction (talker to listener(s)), and there may be a clear indication of speech direction changes (via a floor control). For example, at any given point-in-time during a call, only a user with floor control speaks with the other participants (e.g., users without floor control) of the call listening. The end-to-end call setup time is typically critical, and in some embodiments may need to be less than about 500 ms. The floor request ACK time may also be critical, and in some embodiments may need to be less than about 200 ms. Calls are typically shorter, but more frequent, and call setup/teardown may be performed frequently. There may be fewer silence periods between speech, and participants typically release the floor when they are not talking.

An embodiment communications network 104 may have an available spectrum (e.g., channel bandwidth) set by a telecommunications standard. For example, an embodiment communications network 104 may be in accordance with Third Generation Partnership Project (3GPP) standards, and provide channel bandwidths of 1.4, 5, 10, 20, and 100 MHz or more. An embodiment communications network 104 may further provide up to 4×4 Multiple Input Multiple Output (MIMO) MCS scheme. Base stations and client devices in communications network 104 may rely on radio-frequency (RF) quality metrics, such as Channel Quality Indicators (CQIs), as well as other metrics, such as data block size, to select appropriate MCS for communications. For example, a base station may select a particular MCS for a specific transmission (e.g., a packetized data block transfer) to a client device using a CQI determined for the client device and size of the transfer. In general, a CQI indicates a maximum possible data rate at current signal-to-noise conditions of a connection between a client device and a base station. CQI values range from one to fifteen, and a lower CQI number indicates a lower maximum possible data rate and a corresponding lower Signal-to-Noise Ratio (SNR). In an embodiment communications network 104, client devices 102 provide CQI measurements to base stations of communications network 104, and communications network 104 uses the reported CQI value for cell capacity estimation, scheduling, and the like. Furthermore, in an LTE system, the size of the data block transfer (sometimes referred to as data block size) is generally the size of an internet protocol (IP) data block (e.g., the size of audio data in a PTT transmission) to be transmitted plus LTE overheads (e.g., LTE MAC Layer 2 (L2), radio link control (RLC) Layer, and packet data convergence protocol (PDCP) Layer).

Although CQI is known by the client device 102 and the base stations of communications network 104, such information may not be explicitly available to clients (e.g., a PTT client) residing on client device 102. For example, the operating system (e.g., Android, iOS, and the like) may not provide CQI information to application clients. Instead, the operating system may summarize channel quality information (e.g., Signal-to-Noise Ratio (SNR), Signal-to-Interference-Plus-Noise Ratio (SINR), Signal-to-Noise-Plus-Distortion Ratio (SNDR), or the like) as a generic signal strength indicator (e.g. Reference Signal Received Quality (RSRQ), Received Signal Strength Indicator (RSSI), or the like), and actual CQI values may not be explicitly provided to an application client (e.g., PTT client).

In various embodiments, the application client (e.g., a PTT client) may estimate CQIs using the generic signal strength indicator and historic data correlating the generic signal strength indicator with CQI. For example, the telecommunications services platform may correlate real-world CQI measurements with generic signal strength indicators, and an algorithm is developed for determining CQI from a generic signal strength indicator using, for example, regression analysis, or the like. In other embodiments, the application client may rely on lower layer LTE information (when available), such as reported CQI, MCS allocated by telecommunications network 104 (e.g., for non-PTT communications), or the like to estimate CQI and/or MCS. In such embodiments, the lower layer LTE information may be read by dedicated application process interfaces (APIs) residing on client device 102.

Based on an estimated CQI, the application client may determine an estimated MCS and a corresponding estimated transport block size (TBS), which the application client predicts a base station will use for transmissions with the client device given the estimated CQI. Generally, a TBS corresponding to a specific MCS may be set in a telecommunications standard, such as 3GPP, or the like. In some embodiments, the client device may also determine a suggested MES corresponding to the estimated MCS and/or TBS. As used herein, a MES may be used to describe one or more parameters for communications, such as, codec type, code rate, frame rate (e.g., number of media frames in a packet), a combination thereof, or the like, which may correspond to optimized (or at least improved) allocation of resources given the estimated TBS and/or estimated MCS. In some embodiments, the application client may use one or more table(s) correlating MCS's with CQI values to determine an estimated MCS. Based on the estimated MCS, the application client may look up a corresponding estimated TBS. In some embodiments, the applicant client may further determine a suggested MES based on the estimated TBS. For example, the suggested MES may define a specific frame rate, codec, and/or code rate given the estimated TBS. The MES may be selected using known information such as the size of each media frame, size of the headers of each packet (e.g., IP header, UDP header, RTP header or Robust Header Compression (RoHC) header), and the range of packet bundling rates suitable for PTT application (e.g., as defined by configurable thresholds). The size of each media frame may be calculated by multiplying the media frame length (e.g., time span) with the code rate of the intended codec. Thus, by adjusting code rate, codecs, and frame rates, a particular set of parameters may be optimized for a particular TBS. In some embodiments, an estimated MCS/TBS may be correlated with one or more suggested MES's based in a configurable table.

In an embodiment, an estimated MCS with a smaller estimated TBS may correlate with a lower estimated CQI, and MES with a lower rate codec and/or lower frame rate (e.g., utilizing fewer data blocks per packet) is suggested to fit media data into smaller transport blocks. As another example, an estimated MCS with a larger estimated TBS may correlate with a higher estimated CQI. A larger estimated TBS may result in the client device suggesting a MES with a higher rate codec and/or frame rate (e.g., utilizing more data blocks per packet). Higher frame rates may reduce wasted resources used for data block padding (e.g., reducing the transmission of partial data blocks). Higher frame rates may also reduce a total number packets used for a transmission, which reduces resources used for transmitting overlapping IP/RTP and transport header overhead. A configurable minimum packet bundling rate threshold (e.g., three frames/packet) and/or a configurable maximum packet bundling rate threshold (e.g., fifteen frames/packet) may be set for the telecommunications services platform. In some embodiments, the table(s) correlating MCS's/MES's and CQI may also account for other factors such as Quality of Server (QoS) metrics, priority, and the like. A more detailed description of CQI estimation and corresponding MCS estimation and MES (e.g., codec, code rate, and/or frame rate) selection may be found in commonly-assigned U.S. patent application Ser. No. 15/287,014 filed on Oct. 6, 2016, entitled "PTT Network with Radio Condition Aware Media Packet Aggregation Scheme," which is hereby incorporated by reference. Other methods for determining an estimated MCS and/or suggested MES may also be used.

Figure 2:
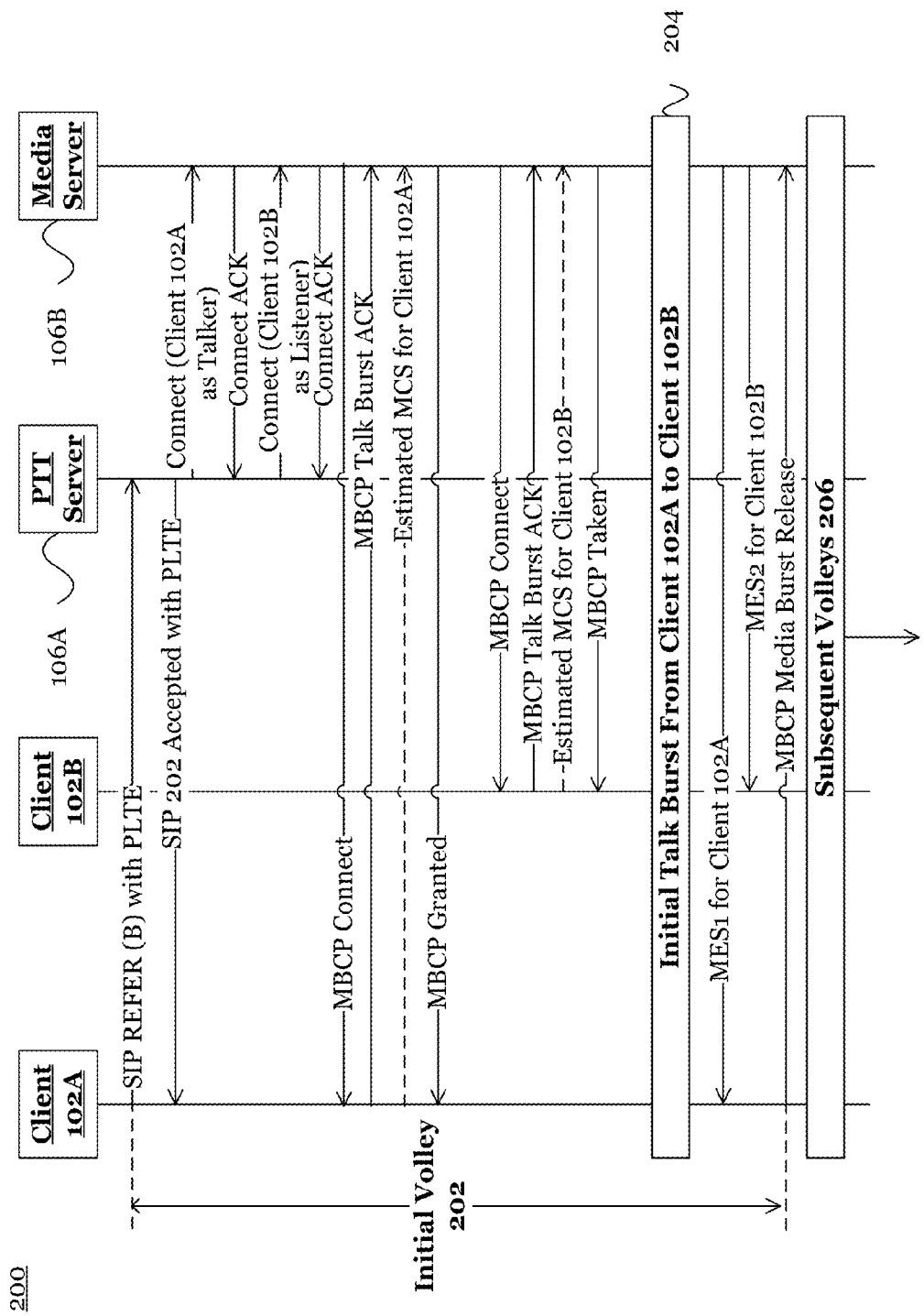
FIG. 2 is a block diagram illustrate call flows in a one-on-one (1-1) call session according to various embodiments.

FIG. 2 illustrates a block diagram 200 of signaling during a one-on-one (1-1) PTT call in a PTT platform (e.g., platform 106) according to some embodiments. Block Diagram 200 is sequential in time, with a lower relative position indicating signals transmitted at a later time. In an embodiment, messages transmitted and received in FIG. 2 may be performed using a PTT over LTE (PLTE) or other PTT over Cellular (PoC) platform. In FIG. 2, the 1-1 PTT call is between a first client device 102A and a second client device 102B. A PTT server 106A (e.g., a first server of a PTT services platform) may be used to initialize the 1-1 PTT call, and a media server 106B (e.g., a second server of the PTT service platform) may host the 1-1 PTT call. For example, media server 106B may setup call legs with client device 102A and 102B, arbitrate floor control (e.g., arbitrating which client device has the right to speak), select parameters for call traffic (e.g., selecting a MES's for each client device), forward transmissions to and from each client device 102A/102B, and the like. Although media server 106B is illustrated as directly communicating with client devices 102A and 102B, in other embodiments, media server 106B communicates with client devices 102A and 102B through PTT server 106A.

In FIG. 2, first client device 102A is a call originator. First client device 102A starts the 1-1 PTT call session by transmitting a session initiation request (e.g., a Session Initiation Protocol (SIP) REFER message) to PTT server 106A, and PTT server 106A may accept the session initiation request (e.g., in an SIP 202 Accepted message). The session initiation request may identify second client device 102B, which first client device 102A desires to conduct a 1-1 PTT call with. PTT server 106A may further request media server 106B to setup a 1-1 PTT call with first client device 102A as a talker (e.g., grant floor control to client device 102A) and second client device 102B as a listener.

Subsequently, media server 106B initiates the 1-1 PTT call. Initiating the 1-1 PTT call may begin by transmitting a connection message (e.g., a Media Burst Control Protocol (MBCP) Connect message) from media server 106B to first client device 102A. First client device 102A may acknowledge the connection message and optionally transmit an estimated MCS for first client device 102A. The estimated MCS for first client device 102A may be determined, by a PTT client on first client device 102A, using an estimated CQI according to the method(s) described above. In some embodiments, the first client device 102A may transmit the estimated MCS in an SIP OPTIONS message to media server 106B, for example. Client device 102A may transmit an estimated MCS explicitly or implicitly (e.g., by transmitting an estimated TBS corresponding to the estimated MCS, a suggested MES determined in accordance with the estimated MCS and/or TBS, or a combination thereof). In other embodiments, the estimated MCS of client device 102A is transmitted at another point in time during the 1-1 PTT call session or before the 1-1 PTT call session. For example, the estimated MCS of client device 102A may be transmitted to PTT server 106A with the session initiation request, during a wake-up message, during a predictive wakeup call setup or acknowledgement (ACK) message (e.g., as described in U.S. Pat. No. 8,478,261, entitled "Predictive Wakeup for Push-To-Talk-Over-Cellular (PoC) Call Setup Optimizations," patented Jul. 2, 2013, which application is hereby incorporated by reference), during a pre-call keep alive message, or at any other suitable time. In embodiments where PTT server 106A receives the estimated MCS of client device 102A, PTT server 106A forwards the estimated MCS for first client device 102A to media server 106B.

Next, media server 106B grants floor control to the first client device 102A using, for example, a MBCP Granted message. Granting the floor to the first client device 102A gives first client device 102A permission to talk until first client device 102A releases the floor. Generally, all signals from a call initiation request, through an initial talk burst 204, and until the first client device 102A releases the floor for the first time is referred to as initial volley 202. Initial talk burst 204 refers to the first time a call originator (first client device 102A in FIG. 2) talks to a call terminator (second client device 102B in FIG. 2) during a call session, and no talk bursts occur before initial talk burst 204 during the call session.

Media server 106B also connects second client device 102B to the 1-1 PTT call session as a listener. For example, media server 106B may transmit a connection message (e.g., a Media Burst Control Protocol (MBCP) Connect message)

to second client device 102B. Second client device 102B may acknowledge the connection message and optionally transmit an estimated MCS for second client device 102B. The estimated MCS for second client device 102B may be determined, by a PTT client on second client device 102B, using an estimated CQI of second client device 102B according to the method(s) described above. In some embodiments, second client device 102B may transmit the estimated MCS in an SIP OPTIONS message to the PTT server 106A and/or the media server 106B, for example. In various embodiments, second client device 102B may transmit an estimated MCS explicitly or implicitly (e.g., by transmitting an estimated TBS corresponding to the estimated MCS, a suggested MES determined in accordance with the estimated MCS/TBS, or a combination thereof). In other embodiments, the estimated MCS of second client device 102B is transmitted at another point in time during the 1-1 PTT call session or before the 1-1 PTT call session. For example, the estimated MCS of second client device 102B may be transmitted to PTT server 106A with session initiation request, during a wake-up message during predictive wakeup call setup or acknowledgement (ACK) message (e.g., as described in U.S. Pat. No. 8,478,261), during a pre-call keep alive message, or at any other suitable time. In embodiments where PTT server 106A receives the estimated MCS of second client device 102B, PTT server 106A forwards the estimated MCS for second client device 102B to media server 106B. Media server 106B may further signal to second client device 102B that the floor is taken using, for example, a MBCP Taken message. Indicating the floor is taken to second client device 102B sets second client device 102B up as a listener and does not grant second client device 102B permission to talk.

After the 1-1 PTT call session between first client device 102A and second client device 102B is initialized, an initial talk burst 204 from first client device 102A (as the talker) to second client device 102B (as the listener) occurs. The initial talk burst 204 may include the first client device 102A transmitting audio data to media server 106B using an initial MES, and the media server 106B forwarding audio data to second client device 102B using the initial MES. The initial MES may be different than both the suggested MES for first client device 102A and second client device 102B if such suggested MES's are provided. The initial MES may also be independent from (e.g., not determined in accordance with) estimated MCS's provided by client devices 102A/102B. In various embodiments, the initial MES may be selected to reduce end-to-end call setup time (e.g., the time period between the call initiation request and initial talk burst 204). For example, the initial MES may use a lower range of packetization (e.g., three to four frames per packet) than MES's corresponding to estimated MCS's of first client device 102A and second client device 102B. As another example, the initial MES may define a relatively small-sized data codec (e.g., Advanced Multi-Band Excitation (AMBE) 2.6 kbps, Codec2, or the like). For example, a lower packetization initial MES may be selected to balance overheads (e.g., Radio Link Control (RLC), Internet Protocol (IP), Media Access Control (MAC), and/or the like overheads). In an embodiment, the initial MES for an initial volley may be known to first client device 102A prior to the call session. For example, the initial MES may be transmitted to client devices from the PTT platform during PTT client registration or the like. In some embodiments, the initial MES can also be based on heuristic algorithms set by PTT server 106A/media server 106B. PTT server 106A/media server 106B may configure an application client to use certain MES's during certain hours of day and/or at certain locations based on expected RAN resource utilization as determined based on historic PTT usage data. The server can program these heuristic algorithms defining initial MES's on application clients remotely. In some embodiments the heuristic algorithms defining initial MES's may be updated periodically (e.g., multiple times during a day, daily, weekly, monthly, or the like). Thus, first client device 102A can automatically transmit data using the initial MES for initial talk burst 204 without requiring explicit MES instructions from media server 106B during call session initiation. By reducing the need to explicitly signal client-specific MESs during call setup, end-to-end call setup time can be reduced.

After first client device 102A finishes talking, first client device 102A may release the floor, for example, by transmitting an MBCP Media Burst Release message to media server 106B. Releasing the floor after initial talk burst 204 also ends initial volley 202. At some point during initial volley 202 or after initial volley 202, media server 106B transmits instructions to use a first MES (labeled MES1 in FIG. 2) during subsequent volleys 206 to first client device 102A, and media server 106B also transmits instructions to use a second MES (labeled MES2 in FIG. 2) during subsequent volleys 206 to second client device 102B. In subsequent volleys 206 (e.g., talk bursts after initial volley 202), the first MES is used for transmissions between media server 106B and first client device 102A, and the second MES for is used for transmissions between media server 106B and second client device 102B. Each subsequent volley 206 may begin with a floor request to media server 106B from either first client device 102A or second client device 102B, and each subsequent volley 206 ends when the floor is released. Media server 106B may select the first MES in response to the estimated MCS for first client device 102A, and media server 106B may select the second MES in response to the estimated MCS for second client device 102B.

In some embodiments, the first MES and the second MES may also be selected in response to other factors, such as, overall PTT call density in respective cells where first client device 102A and second client device 102B are located, the call session type of the PTT call session (e.g., 1-1 call session in FIG. 2), service quality constraints (e.g., voice Mean Opinion Score (MoS) thresholds), combinations thereof, or the like. For example, the first MES and/or the second MES may have a lower frame rate (sometimes referred to as packetization rate or packet bundling rate) than MES's corresponding to respective estimated MCS's for first client device 102A and/or second client device 102B when the PTT platform determines the first client device 102A and/or the second client device 102B is located in a cell having higher PTT call density (e.g., higher than a configurable threshold). Location information of various clients may be reported by each cell to the PTT platform, and the PTT platform may further track usage information to estimate PTT call density in various cells where clients are located.

Furthermore, during subsequent volleys 206, the selected MES's (e.g., the first MES and the second MES) may define codecs and/or other signaling parameters that are adjusted for each leg (e.g., between client device 102A and media server 106B and between client device 102B and media server 106B) of the call session based on respective estimated CQI, location information, traffic conditions, and the like of client devices 102A and/or 102B. For example, in subsequent volleys 206, codec(s) having a higher code rate may be used for transmissions between client devices 102A/102B and the platform.

Figure 3:
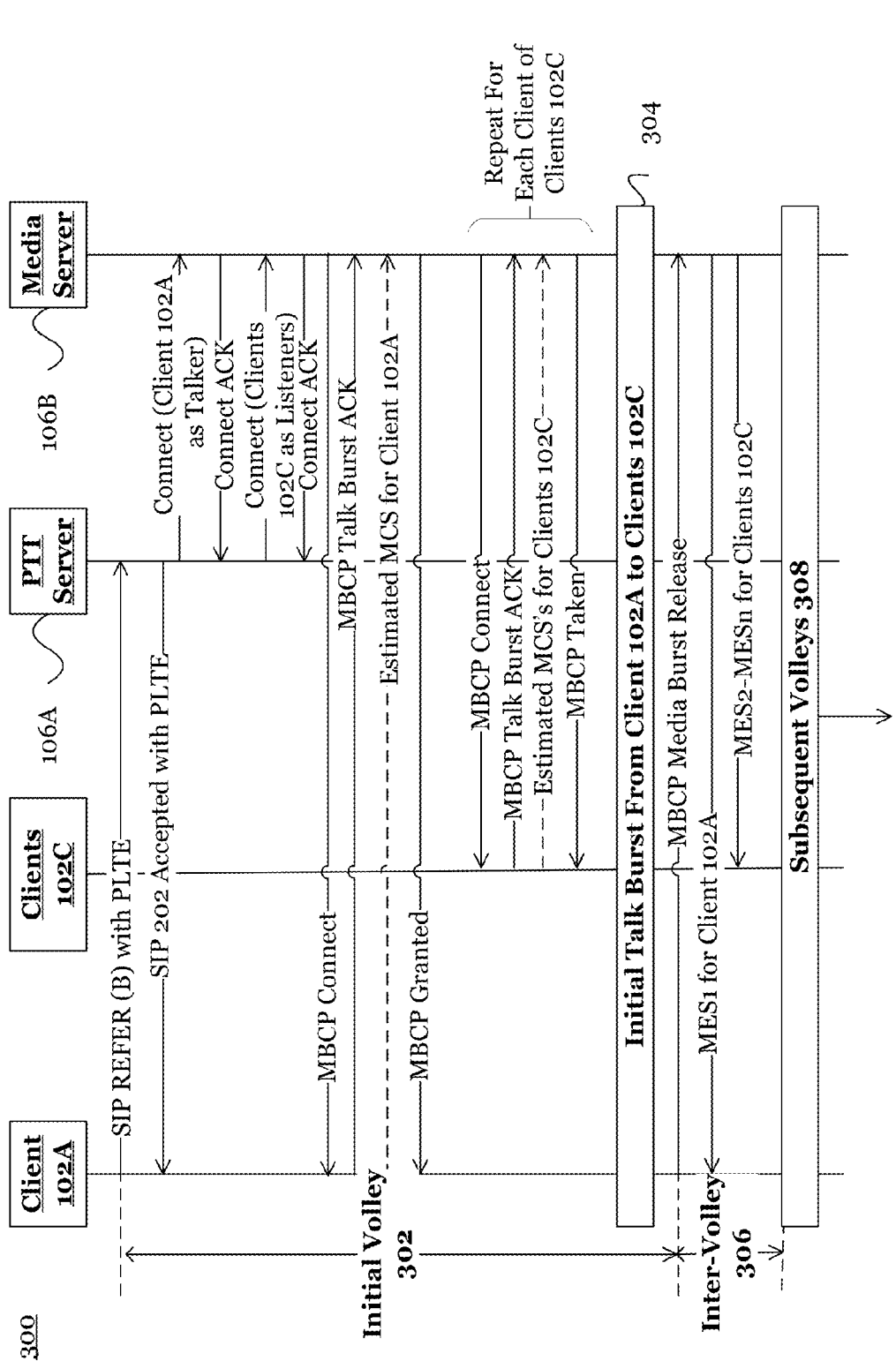
FIG. 3 is a block diagram illustrate call flows in a group call session according to various embodiments.

FIG. 3 illustrates a block diagram 300 of signaling during a group PTT call in a PTT platform (e.g., platform 106) according to some embodiments. Block diagram 300 is sequential in time, with a lower relative position indicating signals transmitted at a later time. In an embodiment, messages transmitted and received in FIG. 3 may be performed using a PTT over LTE (PLTE) or other PTT over Cellular (PoC) platform. In FIG. 3, the group PTT call is between a first client device 102A and a plurality of second client devices 102C. PTT server 106A may be used to initialize the 1-1 PTT call, and media server 106B (e.g., a second server of the PTT service platform) may host the 1-1 PTT call. For example, media server 106B may setup call legs with client device 102A and each of the plurality second client devices 102C, arbitrate floor control (e.g., arbitrating which client device has the right to speak), select parameters for call traffic (e.g., selecting MES's for each client device), forward transmissions to and from each client device 102A/102C, and the like. Although media server 106B is illustrated as directly communicating with client devices 102A and 102C, in other embodiments, media server 106B communicates with client devices 102A and 102C through PTT server 106A.

In FIG. 3, first client device 102A is a call originator. First client device 102A starts the 1-1 PTT call session by transmitting a session initiation request (e.g., a SIP REFER message) to PTT server 106A. The session initiation request may identify client devices 102C, which first client device 102A desires to conduct a group PTT call with. PTT server 106A may accept the session initiation request (e.g., in an SIP 202 Accepted message). PTT server 106A may further request media server 106B to setup a group call with first client device 102A as a talker (e.g., grant floor control to client device 102A) and the plurality second client devices 102C as listeners.

Subsequently, media server 106B initiates the group PTT call with first client device 102A and each of the plurality of second devices 102C. Initiating the group PTT call with first client device 102A may include a substantially similar protocol between media server 106B and first client device 102A as the 1-1 PTT call described in FIG. 2. Thus, detailed description of group call initiation messages between first client device 102A and media server 106B is omitted for brevity. First client device 102A may transmit an estimated MCS for first client device 102A using a SIP OPTIONS message with a MBCP Talk Burst ACK message or at any other suitable time during the group call session or before the group call session. For example, the estimated MCS could be transmitted during session initiation request, during a wake-up message during predictive wakeup call setup or ACK message, during a pre-call keep alive message, or the like. In some embodiments, first client device 102A transmits the estimated MCS implicitly by transmitting an estimated TBS and/or suggested MES corresponding to the estimated MCS as described above. Media server 106B grants floor control to the first client device 102A using, for example, a MBCP Granted message. Granting the floor to the first client device 102A gives first client device 102A permission to talk until first client device 102A releases the floor. Generally, all signals from a call initiation request, through an initial talk burst 304, and until the first client device 102A releases the floor for the first time is referred to as initial volley 302. Initial talk burst 304 refers to the first time a call originator (first client device 102A in FIG. 3) talks to call terminators (client devices 102C in FIG. 3) during the group call session, and no talk bursts occur before initial talk burst 304 during the group call session.

Media server 106B also connects each of the plurality of second client devices 102C to the group PTT call session as listeners. Connecting each of the plurality of second client devices 102C may be performed by iteratively repeating a substantially similar protocol as the protocol described for connecting second client device 102B to a 1-1 PTT call in FIG. 2. Thus, detailed description of group call initiation messages between first client device 102A and client devices 102C is omitted for brevity. Each of the plurality of second client devices 102C may transmit an estimated MCS for a respective client device 102C using SIP OPTIONS messages with MBCP Talk Burst ACK messages or at any other suitable time during the group call session or before the group call session. For example, the estimated MCS's could be transmitted during session initiation request, during a wake-up message during predictive wakeup (e.g., as described in U.S. Pat. No. 8,478,261) call setup or ACK message, during a pre-call keep alive message, or the like. In some embodiments, second client devices 102C transmit the estimated MCS's implicitly by transmitting estimated TBS's and/or suggested MES's corresponding to the estimated MCS's as described above. Media server 106B may further signal to each of the plurality of second client devices 102C that the floor is taken using, for example, a MBCP Taken message. Indicating the floor is taken to second client devices 102C sets second client devices 102C up as listeners and does not grant second client devices 102C permission to talk.

After the group PTT call session between first client device 102A and the plurality of second client devices 102C is initialized, an initial talk burst 304 from first client device 102A (as the talker) to second client devices 102C (as the listeners) occurs. Initial talk burst 304 may include the first client device 102A transmitting audio data to media server 106B using an initial MES. The initial MES may not correspond to the estimated MCS for first client device 102A, and the initial MES be different than any suggested MES's for first client device 102A. The initial MES may be selected to reduce end-to-end call setup time (e.g., the time period between the call initiation request and initial talk burst 304). For example, the initial MES may define a lower range of frame rate (e.g., three to four frames per packet) than a MES corresponding to the estimated MCS of first client device 102A. A lower packetization initial MES may be selected to balance overheads (e.g., RLC, IP, MAC, and/or the like overheads). As another example, the initial MES may define a relatively small-sized data codec (e.g., AMBE 2.6 kbps, Codec2, or the like) to further reduce call setup time.

The initial MES for an initial volley may be known to first client device 102A prior to the call session. For example, the initial MES may be transmitted to client devices from the PTT platform during PTT client registration or the like. Thus, first client device 102A can automatically transmit data using the initial MES for initial talk burst 304 without requiring explicit MES instructions from media server 106B during the group call session initiation. In some embodiments, first client device 102A determines the initial MCS based on a heuristic algorithm defined by the platform as described above with respect to FIG. 2. By reducing the need to explicitly signal client-specific MES's during call setup, end-to-end call setup time can be reduced.

Furthermore, media server 106B may use the initial MES to encode transmissions for all or a first subset of the plurality of second client devices 102B during initial volley 304. Media server 106B may select the first subset of the plurality of second client devices 102B using any suitable criteria, such as predictive wakeup candidates of first client 102A (e.g., as described in U.S. Pat. No. 8,478,261), and the like. For the remaining clients (referred to as a second subset) of the plurality of second client devices 102C, media server 106B may use a different MES than the initial MES to encode transmissions during initial volley 304. For example, media server 106B may use a MES corresponding to respective estimated MCS's (when known) of each of the second subset of the plurality of second client devices 102B, select a MES based on historic CQI values (e.g., historic CQI values at a particular location, time of day, or the like) corresponding to the second subset of the plurality of second client devices 102B, or the like. In embodiments where historic CQI value corresponding to the second subset of the plurality of second client devices 102B are used to select the different MES, an average CQI value calculated from the historic CQI values may be used.

After first client device 102A finishes talking, the first client device 102A may release the floor, for example, by transmitting an MBCP Media Burst Release message to media server 106B. Releasing the floor after initial talk burst 204 also ends initial volley 202. At some point during initial volley 202 or after initial volley 202, media server 106B transmits instructions to use a first MES (labeled MES1 in FIG. 2) during subsequent volleys 308 to first client device 102A, and media server 106B transmits instructions to use a respective second MES (labeled MES2-MESn in FIG. 2) during subsequent volleys 308 to each of the plurality of second client devices 102C. In subsequent volleys 308 (e.g., talk bursts after initial volley 302), the first MES is used for transmissions between media server 106B and first client device 102A, and a respective second MES is used for transmissions between media server 106B and each of the plurality of second client devices 102C. Media server 106B may select the first MES in response to the estimated MCS for first client device 102A, and media server 106B may select a corresponding second MES in response to an estimated MCS for a particular second client device 102C. In some embodiments, the first MES and the second MES's may also be selected in response to overall PTT call density in respective cells where first client device 102A and the plurality of second client devices 102C are located, the call session type of the PTT call session (e.g., group call session in FIG. 3), service quality constraints (e.g., voice Mean Opinion Score (MoS) thresholds, combinations thereof, or the like. For example, the first MES and/or the second MES may define a lower frame rate than MES's corresponding to the respective estimated MCS's for first client device 102A and second client devices 102C when the PTT platform determines first client device 102A and/or second client devices 102C are located in a cell having relatively high PTT call density (e.g., higher than a configurable threshold). Furthermore, during subsequent volleys 308, MES's may be selected to adjust codecs and other signaling parameters for each leg (e.g., between client device 102A and media server 106B/client device 102B and media server 106B) of the call session based on respective estimated CQI, location information, traffic conditions, and the like of client devices 102A and/or 102B. Heuristics based uplink adjustments may also be made for floor control signaling during subsequent volleys 308. Any delay periods between volleys (e.g., intervolley period 306 between initial volley 302 and a subsequent volley 308) may be used to normalize receiving buffers.

Figure 4:
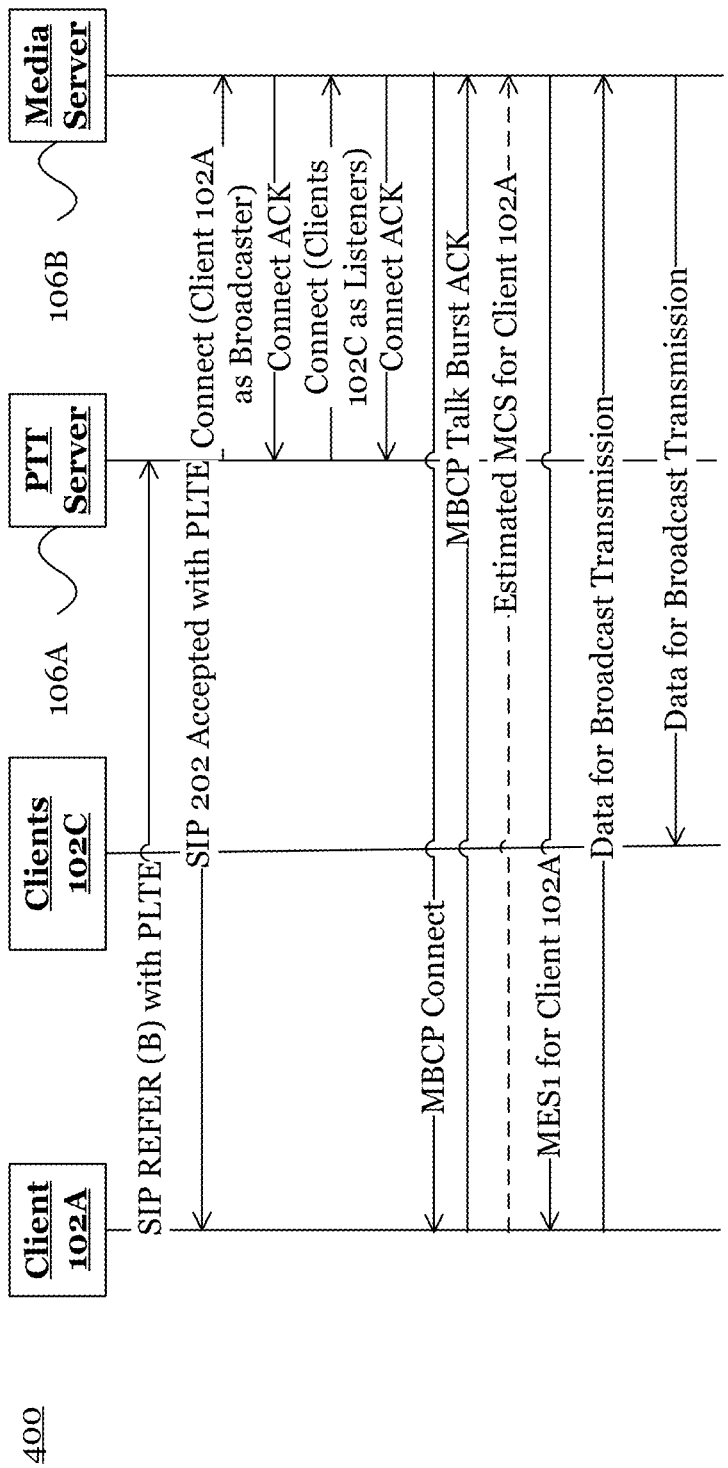
FIG. 4 is a block diagram illustrate call flows in a broadcast call session according to various embodiments.

FIG. 4 illustrates a block diagram 400 of signaling during a PTT broadcast call session in a PTT platform (e.g., platform 106) according to some embodiments. Block diagram 400 is sequential in time, with a lower relative position indicating signals transmitted at a later time. In FIG. 4, the PTT broadcast call session includes transmitting a broadcast from first client device 102A to a plurality of second client devices 102C. PTT server 106A may be used to initialize the PTT broadcast, and media server 106B may relay the broadcast to the plurality of second client devices 102C. For example, media server 106B may setup call legs with client device 102A and each of the plurality second client devices 102C, select parameters for call traffic (e.g., selecting MES's for each client device), receive the broadcast transmission from first client device 102A, forward the broadcast transmission to each of the plurality of second client device 102C, and the like. Although media server 106B is illustrated as directly communicating with client devices 102A and 102C, in other embodiments, media server 106B communicates with client devices 102A and 102C through PTT server 106A.

In FIG. 4, first client device 102A is a broadcaster. First client device 102A starts the PTT broadcast call session by transmitting a session initiation request (e.g., a SIP REFER message) to PTT server 106A. The session initiation request may identify client devices 102C, which first client device 102A desires to send a PTT broadcast transmission. PTT server 106A may accept the session initiation request (e.g., in an SIP 202 Accepted message). PTT server 106A may further request media server 106B to setup a PTT broadcast call session with first client device 102A as a broadcaster and the plurality second client devices 102C as recipients.

Subsequently, media server 106B initiates the PTT broadcast call session. Initiating the PTT broadcast may include transmitting a broadcast connection message (e.g., MBCP Connect) to first client device 102A and receiving a connection ACK (e.g., a MBCP Talk Burst ACK) from first client device 102A. First client device 102A may transmit an estimated MCS explicitly or implicitly (e.g., by transmitting an estimated TBS, a suggested MES corresponding to the estimated MCS/TBS, or a combination thereof) for first client device 102A during broadcast initiation or at any other suitable time during the PTT broadcast call session or before the PTT broadcast call session. For example, the estimated MCS could be transmitted using a SIP OPTIONS message with a MBCP Talk Burst ACK message, during a call session initiation request, during a wake-up message during predictive wakeup (e.g., as described in U.S. Pat. No. 8,478,261) call setup or ACK message, during a pre-call keep alive message, or the like. Media server 106B also transmits instructions to use first MES (labeled MES1 in FIG. 4) during the broadcast to first client device 102A. Unlike 1-1 call sessions or group call sessions, voice latency and call setup time is less of a concern during broadcast sessions. Thus, a client-specific MES may be used from the beginning of a broadcast to improve RAN resource usage efficiency.

Media server 106B may select the first MES in response to the estimated MCS for first client device 102A. In some embodiments, the first MES may also be selected in response to overall PTT call density in a cell where first client device 102A is located as described above. Next, first client device 102A transmits data for the broadcast transmission (e.g., audio data), and the audio data may be encoded using the first MES.

After media server 106B receives the data for the broadcast transmission, media server 106B forwards the data for the broadcast transmission to each of the plurality of second client devices 102C. One goal during a PTT broadcast is the ability to increase the number of simultaneous call deliveries. For example, a PTT broadcast session may be analogous with a one-way group call with a potentially large number of recipients. Thus, the ability to deliver transmissions to each of the large number of recipients in a timely manner may be desired. In some embodiments, the selected MES may define a codec that uses a relatively small amount of data (e.g., AMBE 2.6 kbps) may be used to encode the transmission and reduce the size of each transmission to the plurality of second client devices 102C. Furthermore, a relatively large frame rate (e.g., twenty-two frames per packet) may be defined by the selected MES in order to increase the capacity of transmissions within a network. In some embodiments, the relatively large frame rate may be equal to a maximum frame rate supported by the telecommunications services platform and/or RAN network(s) used to communicate with the plurality of second client devices 102C.

Figure 5:
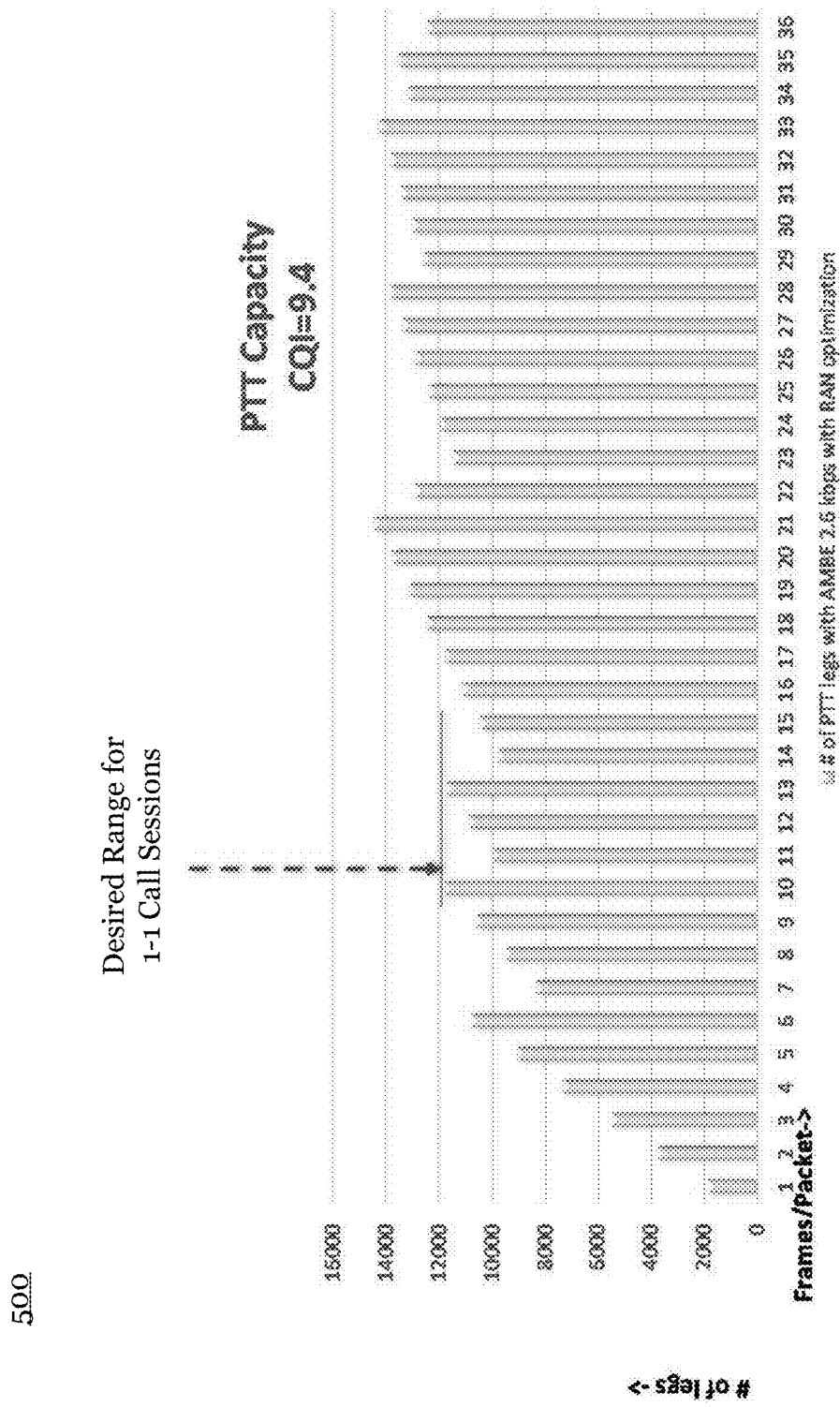
FIGS. 5 through 7 illustrate example frame rates according to various embodiments.
Figure 6:
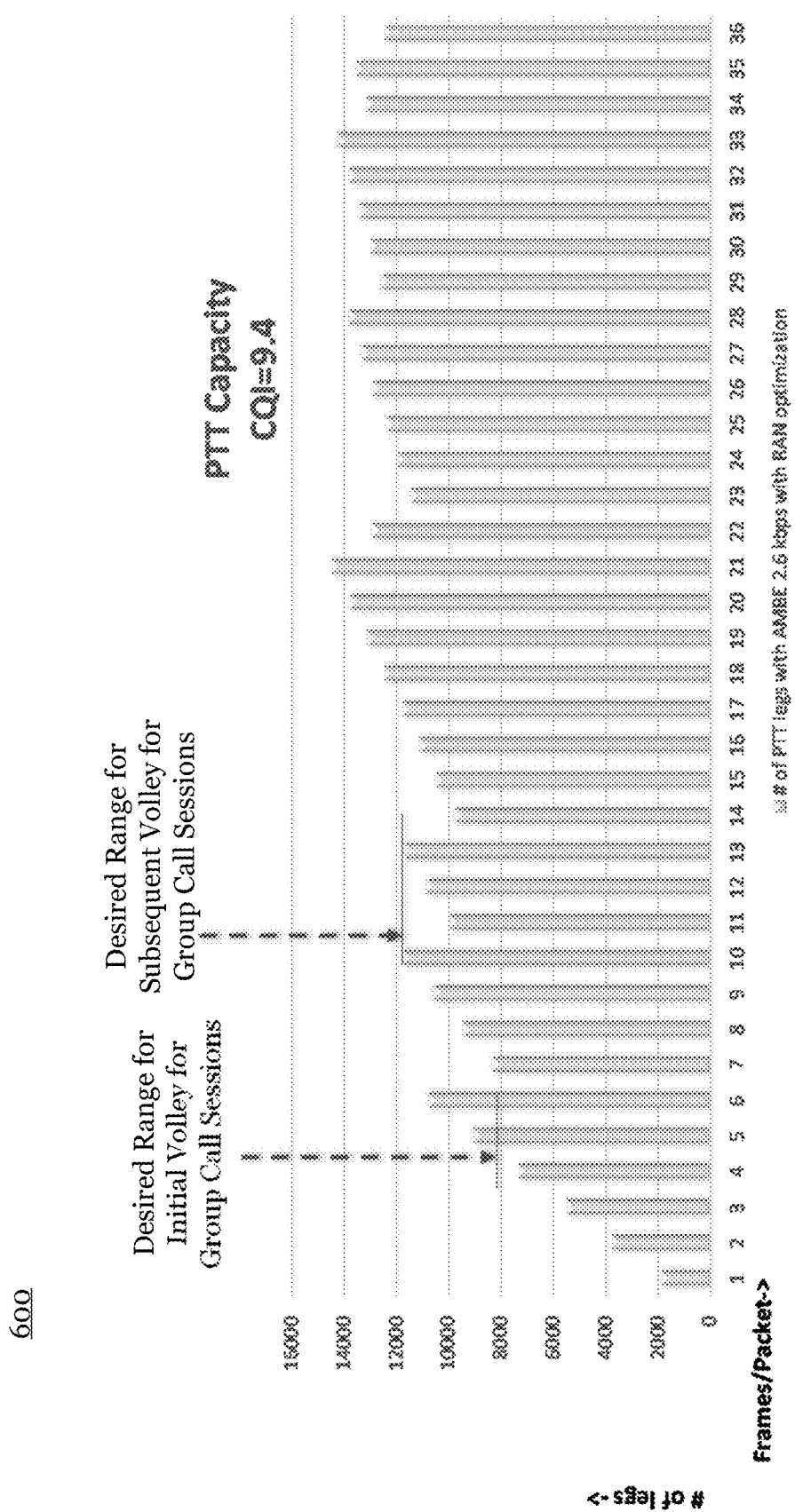
Figure 7:
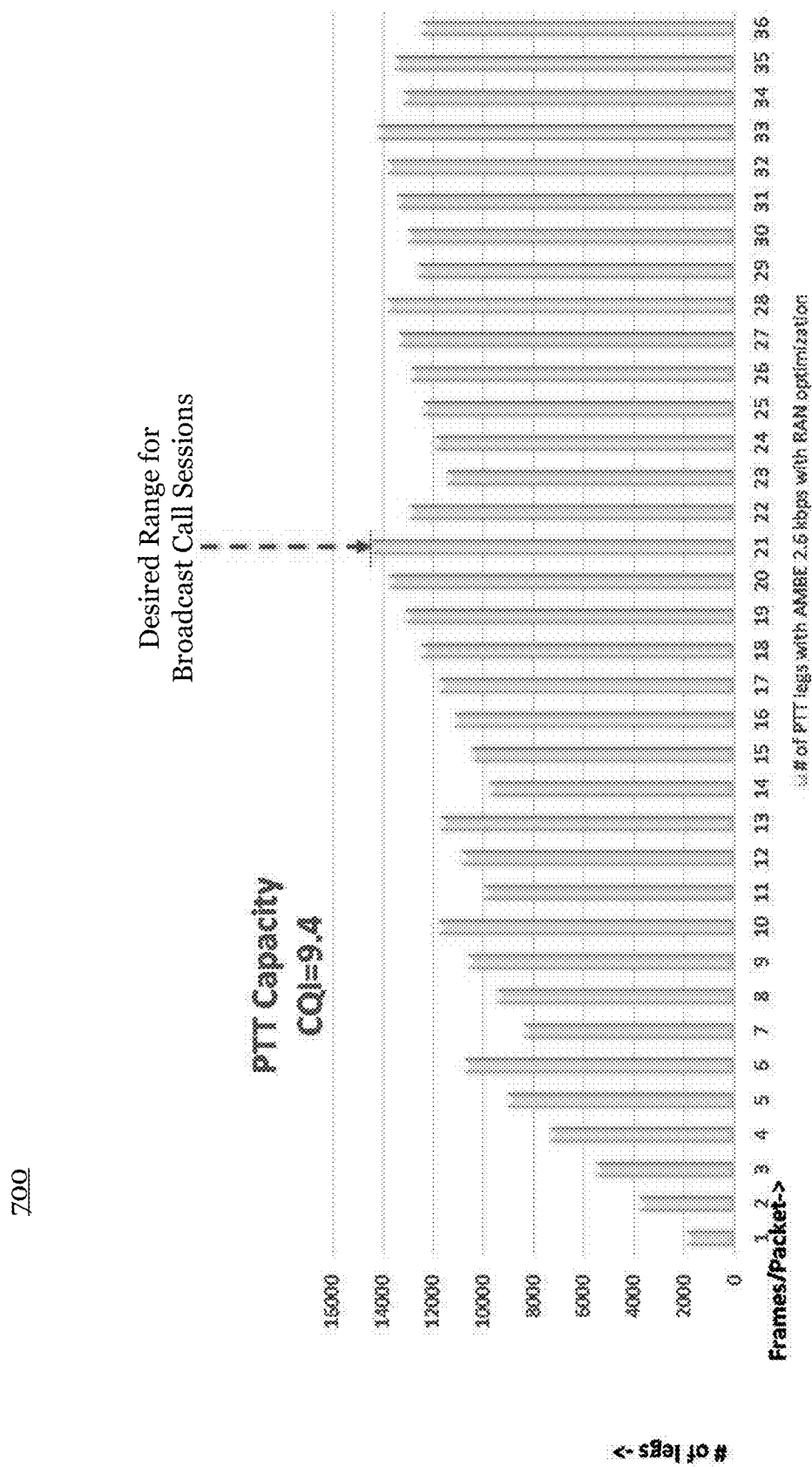

In various embodiments, the selected MES for 1-1 call sessions, group call sessions, and broadcast sessions may be different. For example, FIGS. 5 through 7 illustrate graphs 500, 600, and 700, respectively, which provide desired frames/packet ranges for 1-1 call sessions, group call sessions, and broadcast sessions in a simulation where average CQI of client devices is 9.4 and AMBE 2.6 kbps codecs were used. In FIGS. 5 through 7, the x-axis (horizontal axis) designates number of frames/packet while the y-axis (vertical axis) designates number of PTT legs supported. As illustrated, a desired frames/packet range can vary depending on the call session type of call session (e.g., 1-1, group, or broadcast). Therefore, in some embodiments, the PTT platform (e.g., PTT server 106A and/or media server 106B) may select MES's for client devices in accordance with PTT call session type. In the illustrated embodiments, graphs 500, 600, and 700 may describe desired frame rates for a sample spectrum of 20 MHz with 100% of the spectrum utilized for PTT transmission. By using the frame rates suggested in graphs 500, 600, and/or 700, PTT calls call setup time of 500 ms or less and inter-media latencies within an acceptable range (e.g., as described above) may be achieved. For broadcast calls (e.g., graph 700), call setup time requirements may be replaced, and PTT transmissions utilizing higher packet bundling rates in each packet may be employed to reduce resources used to packet overhead transmissions.

Figure 8A:
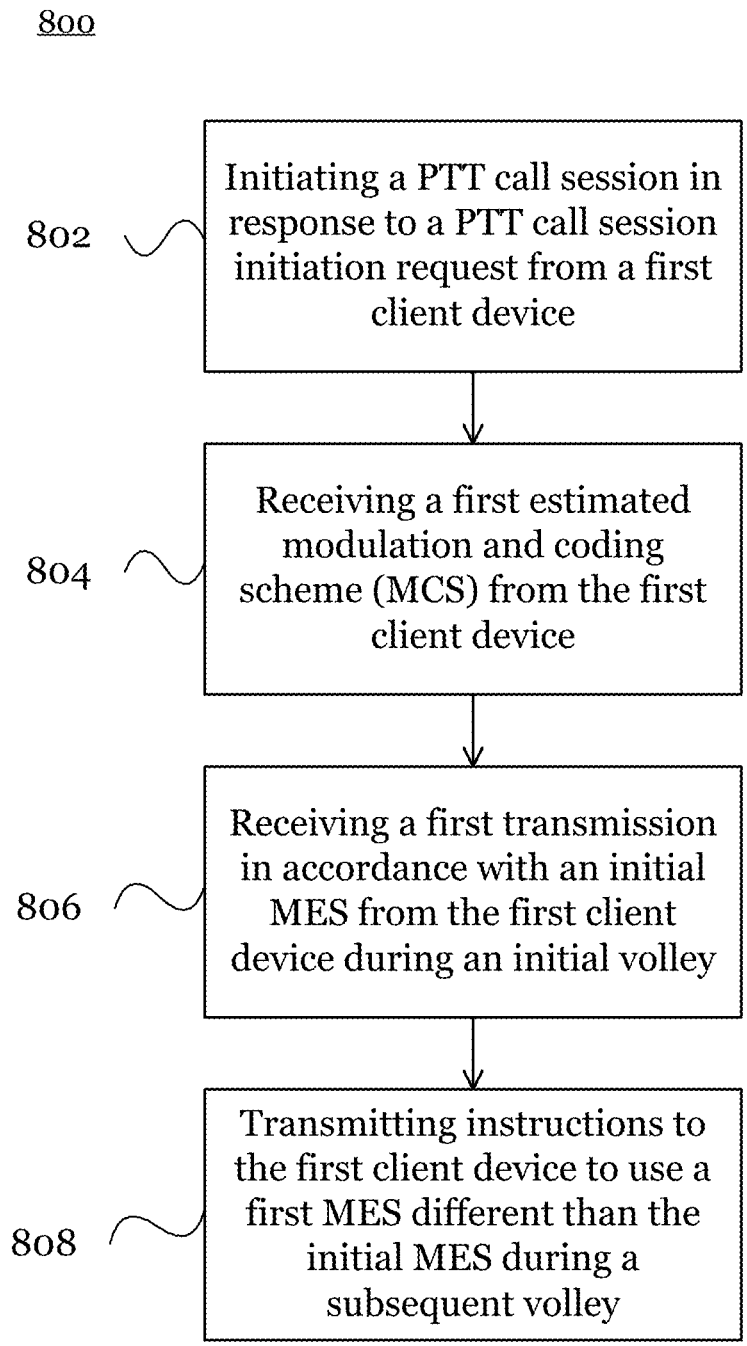
FIGS. 8A and 8B are process flows of server activity according to various embodiments.

FIG. 8A is a flow chart of a process flow Boo performed by one or more servers (e.g., PTT server 106a and/or media server 106b) of a telecommunications services platform (e.g., a PTT platform) in accordance with various embodiments. Process flow 800 beings with the one or more servers initiating a PTT call session in response to a PTT call session initiation request from a first client device (step 802). The PTT call session may be a 1-1 PTT call session between the first client device and a second client device or a group PTT call session between the first client device and a plurality of second client devices. Process flow 800 continues with the one or more servers receiving an estimated MCS from the first client device (step 804). The estimated MCS may be in accordance with an estimated CQI between the first client device and a RAN used by the first client device to communicate with the one or more servers. In some embodiments, a PTT client on the first client device estimates the CQI as discussed above and correlates the estimated CQI with a MCS (and corresponding TBS/frame rate). As used herein, receiving the first estimated MCS may include receiving the first estimated MCS explicitly (e.g., receiving a MCS identifier) or implicitly (e.g., receiving a TBS corresponding to the first estimated MCS or receiving a suggested MES (e.g., defining a /frame rate, codec, code rate, combination thereof, or the like) corresponding to the first estimated MCS).

Process flow 800 continues with the one or more servers receiving a first transmission in accordance with an initial MES from the first client device during an initial volley (step 804). In some embodiments, the first client device may be aware of the initial MES prior to the initiation of the PTT call session, and the first client device may transmit the first transmission without explicit MES instructions from the one or more servers. Thus, signaling during call initiation can be reduced, which advantageously reduces call setup time. The one or more servers may then forward the first transmission to the second client (e.g., in a 1-1 call session) or a plurality of second clients (e.g., in a group call session). In an embodiment 1-1 call session, the one or more servers forwards the transmission using the initial MES to the second client device. In an embodiment group call session, the one or more servers forwards the transmission using the initial MES to a first subset of the plurality of second devices, and the one or more servers forwards the transmission using a different MES than the initial MES to a second subset of the plurality of second devices.

Process 800 continues with the one or more servers transmitting instructions to the first client device to use a first MES different than the initial MES during a subsequent volley (step 808). The first MES may be selected in accordance with the first estimated MCS. In some embodiments, the first MES may also be optionally selected in accordance with PTT call congestion in a cell where the first client device is located. In some embodiments, the first MES has a higher frame rate than the initial MES. In subsequent volleys, communications between the one or more servers and the first client device use the first MES.

The one or more servers may further transmit instructions to one or more second client device to use a respective second MES different than the initial MES during a subsequent volley. Each of the second MES's may be selected in accordance with second estimated MCS's (e.g., as transmitted explicitly or implicitly by the one or more second client devices to the one or more servers). For example, the one or more second client devices may implicitly transmit the second MCS's by transmitting corresponding second TBS's or suggested second MES's. Each of the second suggested MES's may be in accordance with a respective estimated CQI of a second client device. In some embodiments, the second MES's may also be optionally selected in accordance with PTT call congestion in cells where the second client devices are located. In some embodiments, the second MES has a higher frame rate than the initial MES. In subsequent volleys, communications between the one or more servers and the second client device(s) use the second MES's.

Figure 8B:
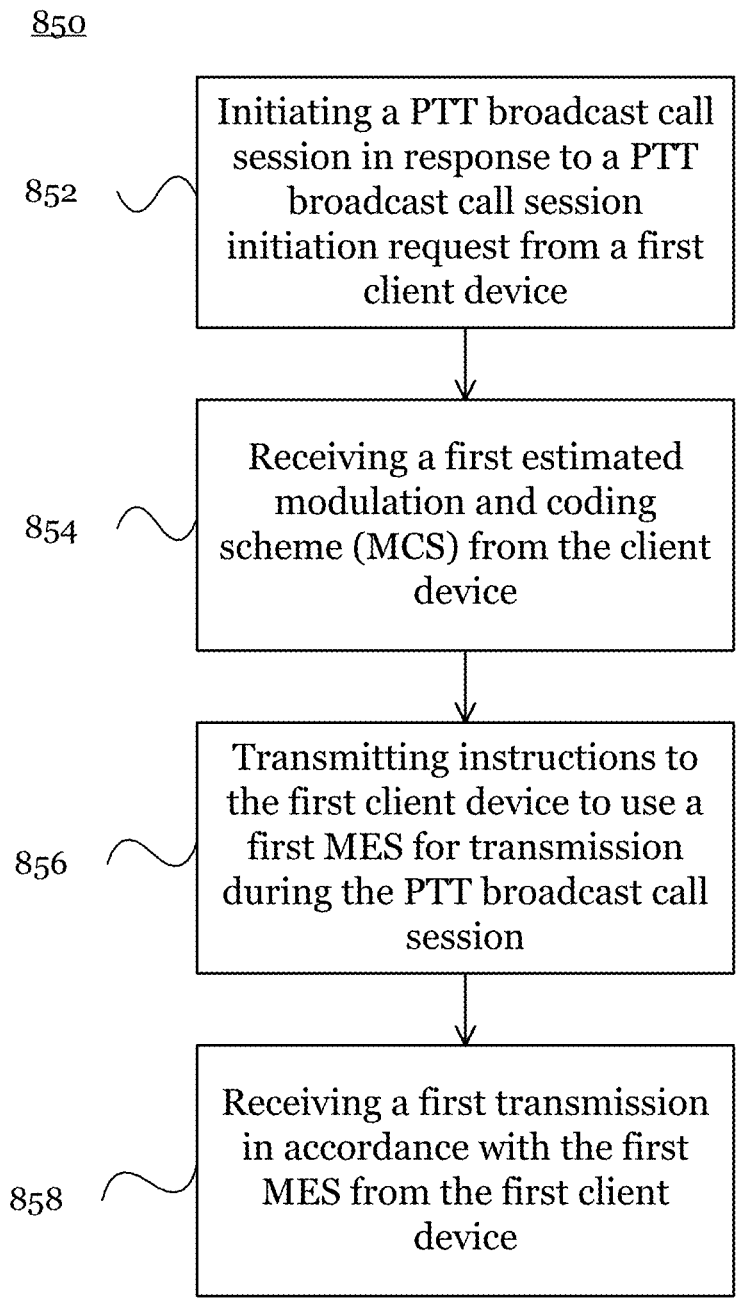

FIG. 8B is a flow chart of a process flow 850 performed by one or more servers (e.g., PTT server 106a and/or media server 106b) of a telecommunications services platform (e.g., a PTT platform) in accordance with various embodiments. Process flow 850 beings with the one or more servers initiating a PTT call session in response to a PTT call session initiation request from a first client device (step 852). IN some embodiments, the PTT call session in process 850 is a PTT broadcast call session. Process flow 850 continues with the one or more servers receiving a first estimated MCS from the first client device (step 854). The first estimated MCS may be in accordance with an estimated CQI between the first client device and a RAN used by the first client device to communicate with the one or more servers. In some embodiments, a PTT client on the first client device estimates the CQI as discussed above and correlates the estimated CQI with a MCS (and corresponding TBS/frame rate). As used herein, receiving the first estimated MCS may include receiving the first estimated MCS explicitly (e.g., receiving a MCS identifier) or implicitly (e.g., receiving a TBS corresponding to the first estimated MCS or receiving a suggested MES (e.g., defining a /frame rate, codec, code rate, combination thereof, or the like) corresponding to the first estimated MCS).

Process flow 850 continues with the one or more servers transmitting instructions to the first client device to use a first MES for transmission during the PTT broadcast call session (step 856). The first MES may be selected in accordance with the first estimated MCS. In some embodiments, the first MES may also be optionally selected in accordance with PTT call congestion in a cell where the first client device is located. Process flow 850 continues with the one or more servers receiving a first transmission in accordance with the first MES from the first client device (step 858). Subsequently, the one or more servers may forward the first transmission to a plurality of second client devices using a second MES. The second MES correspond to a relatively large frame rate in order to increase capacity of the PTT platform. For example, the second MES may correspond with a maximum frame rate supported by the PTT platform.

Figure 9:
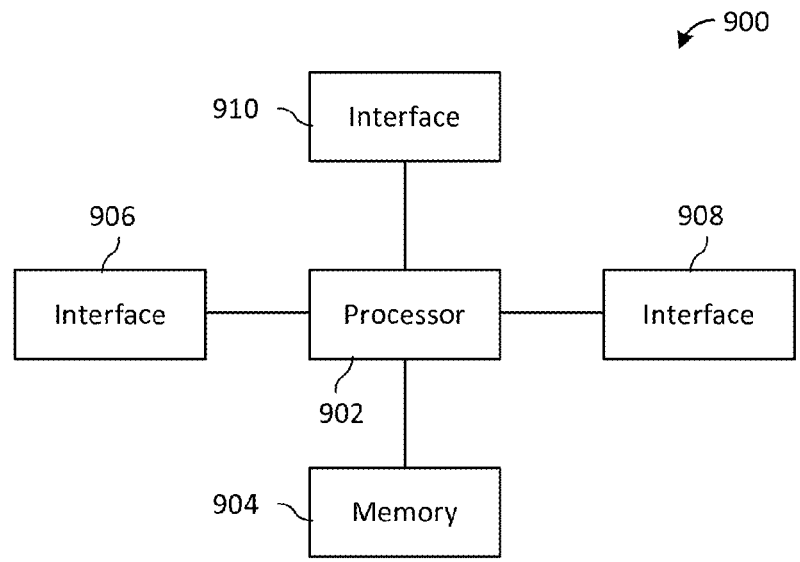
FIG. 9 is a block diagram of an embodiment processing system.

FIG. 9 is a block diagram of an embodiment processing system 900 for performing methods described herein, which may be installed in a host device. As shown, the processing system 900 includes a processor 902, a memory 904, and interfaces 906-910, which may (or may not) be arranged as shown in FIG. 9. The processor 902 may be any component or collection of components adapted to perform computations and/or other processing related tasks, and the memory 904 may be any component or collection of components adapted to store programming and/or instructions for execution by the processor 902. In an embodiment, the memory 904 includes a non-transitory computer readable medium. The interfaces 906, 908, 910 may be any component or collection of components that allow the processing system 900 to communicate with other devices/components and/or a user. For example, one or more of the interfaces 906, 908, 910 may be adapted to communicate data, control, or management messages from the processor 902 to applications installed on the host device and/or a remote device. As another example, one or more of the interfaces 906, 908, 910 may be adapted to allow a user or user device (e.g., personal computer (PC), etc.) to interact/communicate with the processing system 900. The processing system 900 may include additional components not depicted in FIG. 9, such as long term storage (e.g., non-volatile memory, etc.).

In some embodiments, the processing system 900 is included in a network device that is accessing, or part otherwise of, a telecommunications network. In one example, the processing system 900 is in a network-side device in a wireless or wireline telecommunications network, such as a base station, a relay station, a scheduler, a controller, a gateway, a router, an applications server, or any other device in the telecommunications network. In other embodiments, the processing system 900 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 10:
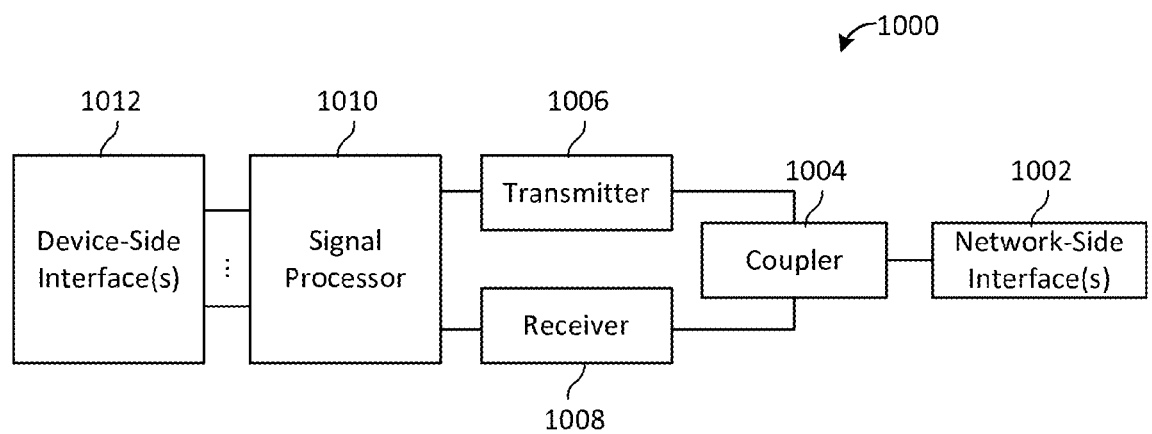
FIG. 10 is a block diagram of an embodiment transceiver.

In some embodiments, one or more of the interfaces 906, 908, 910 connects the processing system 900 to a transceiver adapted to transmit and receive signaling over the telecommunications network. FIG. 10 is a block diagram of a transceiver 1000 adapted to transmit and receive signaling over a telecommunications network. The transceiver 1000 may be installed in a host device. As shown, the transceiver 1000 comprises a network-side interface 1002, a coupler 1004, a transmitter 1006, a receiver 1008, a signal processor 1010, and a device-side interface 1012. The network-side interface 1002 may include any component or collection of components adapted to transmit or receive signaling over a wireless or wireline telecommunications network. The coupler 1004 may include any component or collection of components adapted to facilitate bi-directional communication over the network-side interface 1002. The transmitter 1006 may include any component or collection of components (e.g., up-converter, power amplifier, etc.) adapted to convert a baseband signal into a modulated carrier signal suitable for transmission over the network-side interface 1002. The receiver 1008 may include any component or collection of components (e.g., down-converter, low noise amplifier, etc.) adapted to convert a carrier signal received over the network-side interface 1002 into a baseband signal. The signal processor 1010 may include any component or collection of components adapted to convert a baseband signal into a data signal suitable for communication over the device-side interface(s) 1012, or vice-versa. The device-side interface(s) 1012 may include any component or collection of components adapted to communicate data-signals between the signal processor 1010 and components within the host device (e.g., the processing system 900, local area network (LAN) ports, etc.).

The transceiver 1000 may transmit and receive signaling over any type of communications medium. In some embodiments, the transceiver 1000 transmits and receives signaling over a wireless medium. For example, the transceiver 1000 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 602 comprises one or more antenna/radiating elements. For example, the network-side interface 602 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1000 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Although this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:
1. A method comprising:
initiating, by one or more servers of a push-to-talk (PTT) platform, a PTT call session in response to a PTT call session initiation request from a first client device;

receiving, by the one or more servers, a first estimated modulation and coding scheme (MCS) from the first client device, wherein the first client device communicates with the one or more servers using a radio access network (RAN), and wherein the first estimated MCS is in accordance with an estimated channel quality index (CQI) of a channel between the first client device and the RAN;

receiving, by the one or more servers, a first transmission in accordance with an initial media encoding scheme (MES) from the first client device during an initial volley; and transmitting, by the one or more servers, instructions to the first client device to use a first MES different than the initial MES for a second transmission during a subsequent volley, wherein the subsequent volley is after the initial volley, and wherein the first MES selected is in accordance with the first estimated MCS.

2. The method of claim 1, wherein initiating the PTT call session comprises initiating a one-on-one (1-1) call session between the first client device and a second client device, and wherein the method further comprises forwarding, by the one or more servers, the first transmission to second client device using the initial MES.

3. The method of claim 1, wherein initiating the PTT call session comprises initiating a group call session between the first client device and a plurality of second client devices, and wherein the method further comprises forwarding, by the one or more servers, the first transmission to a first subset of the plurality of second client devices using the initial MES.

4. The method of claim 3 further comprising forwarding, by the one or more servers, the first transmission to a second subset of the plurality of second client devices using one or more second MES's, wherein each of the one or more second MES's is different than the initial MES.

5. The method of claim 4, wherein the one or more second MES's are selected in accordance with an estimated MCS corresponding to one of the second subset of the plurality of second client devices, a historic channel quality index (COI) value corresponding to the second subset of the plurality of second client devices, or a combination thereof.

6. The method of claim 1 further comprising: receiving, by the one or more servers, a second estimated MCS from a second client device, wherein the PTT call session is between the first client device and the second client device; and transmitting, by the one or more servers, instructions to the second client device to use a second MES different than the initial MES for third transmissions during the subsequent volley, wherein the second MES is selected in accordance with the second estimated MCS.

7. The method of claim 1, wherein the initial MES uses a lower frame rate than a first MES corresponding to the first estimated MCS.

8. The method of claim 1, wherein receiving the first transmission in accordance with an initial MES comprises receiving the first transmission encoded using Advanced Multi-Band Excitation (AMBE) 2.6 kbps or Codec2.

9. The method of claim 1, wherein receiving the first estimated MCS comprises receiving the first estimated MES in a session initiation protocol (SIP) OPTIONS message with a media burst control protocol (MBCP) acknowledgement (ACK) message, a call session initiation request, a wake-up message, a predictive wakeup call setup message, a predictive wakeup ACK message, or a pre-call keep alive message.

10. The method of claim 1, wherein the first client device is aware of the initial MES prior to initiating the PTT call session.

11. A telecommunications services platform comprising:
one or more processors; and
a non-transitory computer readable storage medium storing programming for execution by the one or more processors, the programming including instructions to:
initiate a call session in response to a call session initiation request from a first client device;
receive a first estimated modulation and coding scheme (MCS) from the first client device, wherein the first client device communicates with the telecommunications services platform using a radio access network (RAN), and wherein the first estimated MCS is in accordance with an estimated channel quality index (COI) of a channel between the first client device and the RAN;
receive a first transmission in accordance with an initial media encoding scheme (MES) from the first client device during an initial volley; and
transmit instructions to the first client device use a first MES different than the initial MES for a second transmission during a subsequent volley, wherein the subsequent volley is after the initial volley, and wherein the first MES is selected in accordance with the first estimated MCS.

12. The telecommunications services platform of claim 11, wherein the initial volley begins when the telecommunications services platform receives the call session initiation request, and wherein the initial volley ends when the first client device releases floor control.

13. The telecommunications services platform of claim 11, wherein the first MES is further selected in to accordance with overall PTT call density in a cell the first client device is located, a call session type of the call session, service quality constraints, or a combination thereof.

14. The telecommunications services platform of claim 11, the first transmission is encoded using Advanced Multi-Band Excitation (AMBE) 2.6 kbps or Codec2.

15. The telecommunications services platform of claim 11, wherein the call session is a one-on-one (1-1) push-to-talk (PTT) call session or a group PTT call session.

16. A method comprising:
initiating, by one or more servers of a push-to-talk (PTT) platform, a PTT broadcast call session in response to a PTT broadcast call session initiation request from a first client device;
receiving, by the one or more servers, a first estimated modulation and coding scheme (MCS) from the first client device, wherein the first client device communicates with the one or more servers using a radio access network (RAN), and wherein the first estimated MCS is in accordance with an estimated channel quality index (CQI) of a channel between the first client device and the RAN;
transmitting, by the one or more servers, instructions to the first client device use a first MES for a transmission during the PTT broadcast call session, wherein the first MES is selected in accordance with the first estimated MCS; and
receiving, by the one or more servers, a first transmission in accordance with the first MES from the first client device.

17. The method of claim 16 further comprising forwarding, by the one or more servers, the first transmission to a plurality of second client devices using a second MES.

18. The method of claim 17, wherein the second MES defines a maximum frame rate supported by the one or more servers.

19. The method of claim 16, wherein the first MES defines a frame rate, codec, code rate, or a combination thereof to encode transmission between the first client device and the one or more servers.

\* \* \* \* \*